Figure 1:
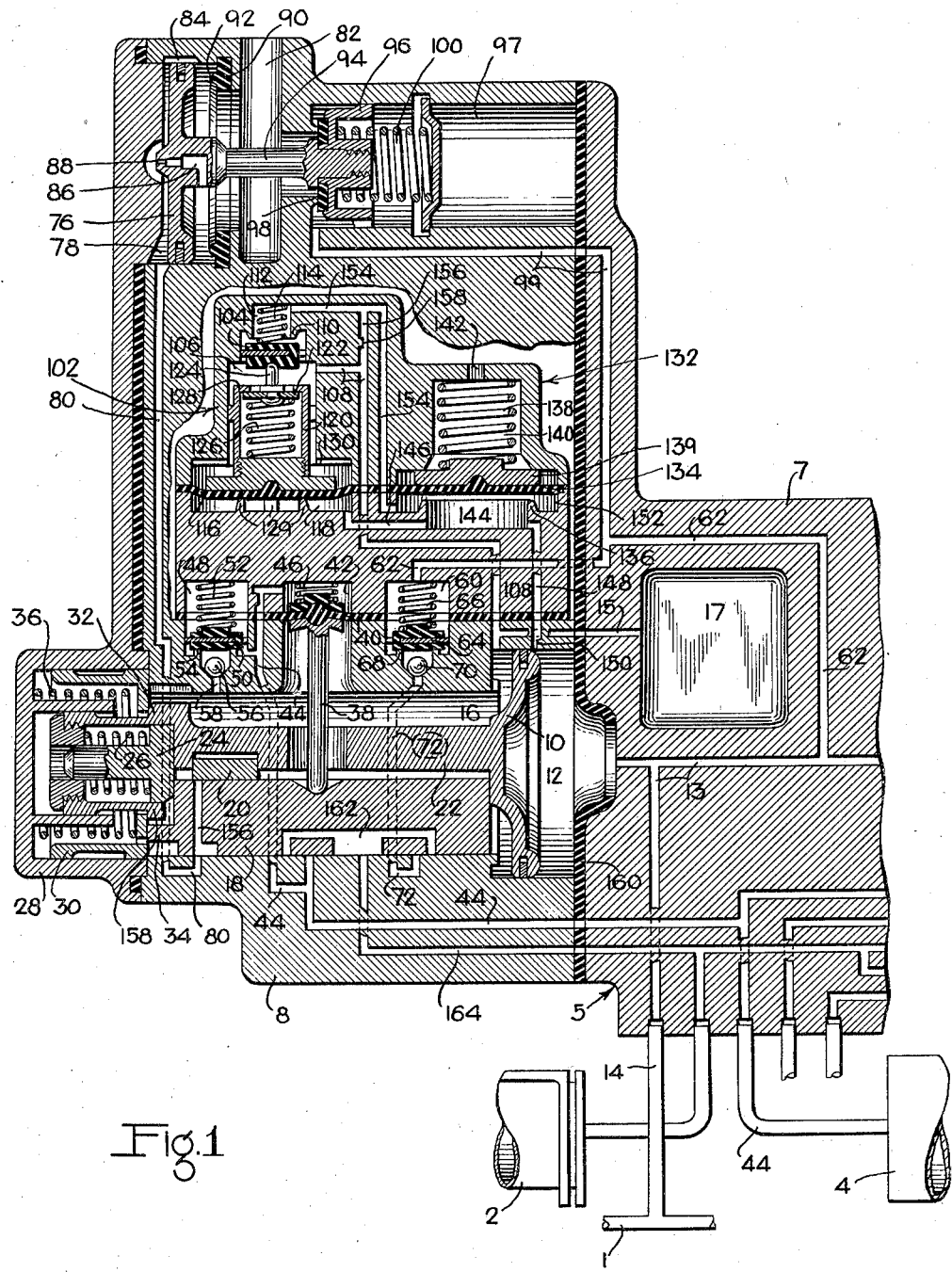

Patented Apr. 26, 1938

2,115,515

UNITED STATES PATENT OFFICE 2,115,515

FLUID PRESSURE BRAKE

John Canetta, Wilkinsburg, Pa., assignor to The Westinghouse Air Brake Company, Wilmerding, Pa., a corporation of Pennsylvania Application June 30, 1936, Serial No. 88,130

27 Claims. (Cl. 303—41)

This invention relates to a fluid pressure brake and more particularly to an improvement in the brake controlling valve device shown in the copending application Serial No. 67,274, of Ellery R. Fitch, filed March 5, 1936.

The brake controlling valve device shown in the above identified application has a movable abutment subject to the opposing pressures of the fluid in the brake pipe and of the fluid in a pressure chamber for controlling emergency applications of the brakes and for controlling a passage through which fluid under pressure may be supplied from the brake cylinder to the brake pipe. This valve device has, in addition, a passage controlled by the movable abutment and through which fluid under pressure may flow from the pressure chamber to the brake pipe at a rate which will permit the pressure of the fluid in the pressure chamber to reduce substantially as rapidly as the pressure of the fluid in the brake pipe is reduced on a reduction in brake pipe pressure at a service rate to thereby prevent the development of sufficient differential between the pressures in the pressure chamber and in the brake pipe to cause the movable abutment to be moved to a position in which the emergency valve device is operative to effect the venting of fluid under pressure from the brake pipe and thereby cause an emergency application of the brakes.

This passage, however, is of insufficient flow capacity to permit fluid under pressure to flow from the pressure chamber to the brake pipe rapidly enough to permit the pressure of the fluid in the pressure chamber to reduce as rapidly as the pressure of the fluid in the brake pipe is reduced when the brake pipe pressure is reduced at an emergency rate. As a result, a differential in the pressures in the pressure chamber and in the brake pipe will be developed, and the movable abutment will move to emergency application position and by this movement it will cut off communication between the pressure chamber and the brake pipe.

Upon a subsequent increase in the pressure of the fluid in the brake pipe to effect the release of the brakes, the abutment is moved from the application position to the release position and on this movement of the abutment, the passage between the brake pipe and pressure chamber is opened so as to permit fluid under pressure to flow to the pressure chamber to restore the pressure of the fluid in the pressure chamber.

There is a possibility, if the rate of increase in the pressure of the fluid in the brake pipe after an application is relatively slow, that the movable abutment will not move far enough from the application position towards the release position to completely open the passage between the brake pipe and the pressure chamber, but will only move far enough to partially open this passage, which, however, will permit fluid under pressure to flow from the brake pipe to the pressure chamber rapidly enough to increase the pressure of the fluid in the pressure chamber as rapidly as the pressure of the fluid in the brake pipe is increased. As a result, there may not be a sufficient differential developed between the pressure of the fluid in the brake pipe and in the pressure chamber to cause further movement of the abutment towards the release position, and the abutment may remain in a position in which it only partially opens the communication between the brake pipe and the pressure chamber.

If this condition occurs, then on a subsequent reduction in the pressure of the fluid in the brake pipe at a service rate to effect a service application of the brakes, fluid under pressure will be unable to flow from the pressure chamber to the brake pipe rapidly enough, because the passage between the pressure chamber and the brake pipe is only partially opened, to permit the pressure of the fluid in the pressure chamber to reduce as rapidly as the pressure of the fluid in the brake pipe is reduced.

As a result upon a reduction in brake pipe pressure at a service rate there will be a constantly increasing difference between the pressure of the fluid in the brake pipe and the pressure of the fluid in the pressure chamber and a sufficient differential may be provided in the brake pipe and the pressure chamber and the higher pressure in the pressure chamber will cause the abutment to move to its application position and thereby produce an undesired emergency application of the brakes.

It is an object of this invention to provide a brake controlling valve device operative to effect an emergency application of the brakes and having a movable abutment subject to the opposing pressures of the fluid in the brake pipe and of the fluid in a pressure chamber, the abutment controlling a communication through which fluid under pressure may flow between the brake pipe and the pressure chamber, means being provided to insure that after an emergency application of the brakes, the abutment will move the entire distance from the application position to the release position.

A further object of the invention is to provide a brake controlling valve device of the type referred to and having means responsive to the pressure of the fluid supplied from the brake pipe to the passage leading from the brake pipe to the pressure chamber for controlling the flow of fluid through this passage, said means being adapted to prevent the flow of fluid to the pressure chamber through this passage until the brake pipe pressure has been increased to a predetermined value which is high enough to insure that the movable abutment will move all of the distance from the application position to the release position.

A further object of the invention is to provide an emergency valve device having a movable abutment subject to the opposing pressures of the fluid in the brake pipe and of the fluid in a pressure chamber and controlling a passage through which fluid under pressure may flow between the brake pipe and the pressure chamber and having an abutment subject to the pressure of the fluid supplied from the brake pipe to this passage for controlling communication through this passage together with valve means operated by this abutment for venting fluid from the pressure chamber.

Another object of the invention is to provide an emergency valve device having a movable abutment subject to the opposing pressures of the fluid in the brake pipe and of the fluid in a pressure chamber and controlling a passage through which fluid may flow from the brake cylinder to the brake pipe and also controlling a passage through which fluid may flow between the brake pipe and the pressure chamber, and having an abutment subject to the pressure of the fluid supplied from the brake pipe to the last named passage for controlling communication therethrough, together with valve means operated by said abutment and controlling the passage through which fluid is supplied from the brake cylinder to the brake pipe.

A further object of the invention is to provide an improved brake controlling valve device.

Figure 2:
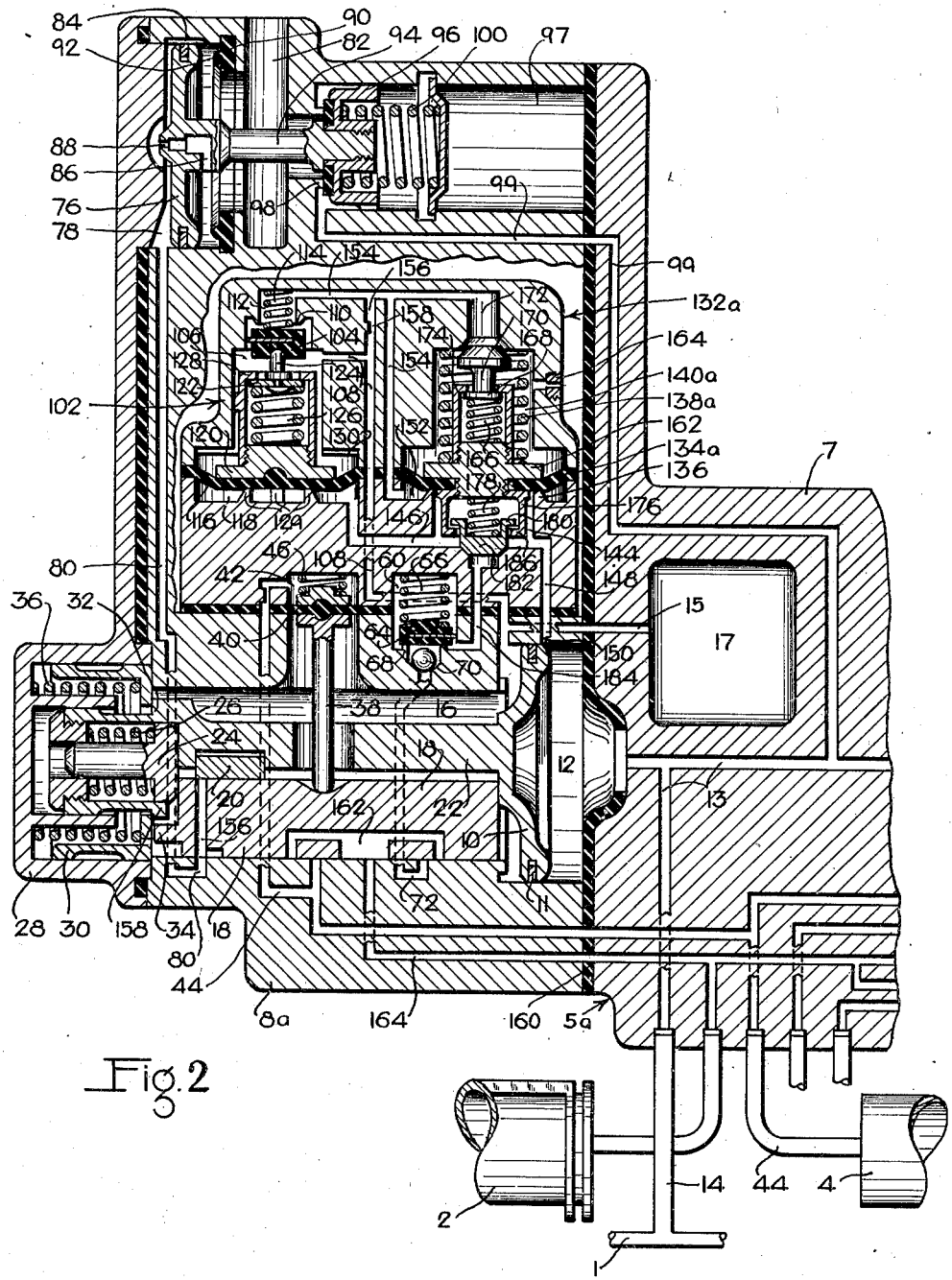

Other objects of the invention and features of novelty will be apparent from the following description taken in connection with the accompanying drawings, in which Fig. 1 is a fragmentary view of a brake equipment employing a brake controlling valve device embodying this invention, and Fig. 2 is a fragmentary view of a brake equipment employing another form of brake controlling valve device embodying this invention.

Referring to the drawings the brake equipment illustrated in Fig. 1 thereof comprises a brake pipe 1, a brake cylinder 2, an emergency reservoir 4, and a brake controlling valve device indicated generally by the reference numeral 5.

The brake controlling valve device 5 comprises a pipe bracket section 7 having a mounting face thereon against which is secured the emergency valve portion 8 provided by this invention, while the pipe bracket section has another mounting face formed thereon, (not shown), against which is secured the service portion, (not shown), of the brake controlling valve device.

The emergency portion of the brake controlling valve device provided by this invention is an improvement on the corresponding section of the brake controlling valve device shown and claimed in U. S. Patent No. 2,301,213, to Clyde C. Farmer, and only such portions of the construction and operation of the valve device are illustrated and described in this application as are essential to the understanding of this improvement.

The emergency valve portion 8 comprises a body having a bore therein in which is mounted a movable abutment in the form of a piston 10 having at one side thereof a chamber 12, which is connected by way of a passage 13 in the pipe bracket section 7 with a branch pipe 14 which communicates with the brake pipe 1.

The piston 10 has at the other side thereof a valve chamber 16 in which is mounted a main slide valve 18 and an auxiliary slide valve 20 which are operated by the piston 10 through a stem 22 formed integral with the piston. The valve chamber 16 is connected by way of a passage 15 with a pressure chamber 17 formed in the pipe bracket section 7.

The stem 22 has a bore in the end thereof in which is mounted a plunger 24 which is yieldingly pressed against the end of the main slide valve 18 by means of a spring 26.

The end of the valve chamber 16 is closed by means of a cover 28 and this cover has a bore therein, in which is mounted a plunger 30 which is adapted to be engaged by a shoulder 32 on the piston stem 22, and by a projection 34 on the end of the main slide valve 18. The plunger 30 is yieldingly urged to the right, as viewed in the drawings, by means of a coil spring 36 while movement of the plunger in this direction is limited by engagement of the plunger 30 with the body of the emergency portion.

The main slide valve 18 is held in engagement with its seat by means of a strut 38 which engages one face of a diaphragm 40. The other face of the diaphragm 40 is subject to the pressure of the fluid in a chamber 42 which is constantly connected by way of a passage and pipe 44 with the emergency reservoir 4. The diaphragm 40 is also subject to the pressure of a spring 46 which is mounted in the chamber 42.

The body of the emergency portion 8 has formed therein a chamber 48 in which is mounted a spill-over check valve 50 which is yieldingly urged by means of a spring 52 into engagement with a seat rib 54.

The chamber 48 is constantly connected with the passage 44 and thereby with the emergency reservoir 4, while the chamber within the seat rib 54 has positioned therein a ball check valve 56 which is adapted to engage a seat formed on the body surrounding a passage 58 which communicates with the valve chamber 16.

The body of the emergency portion 8 also has formed therein a chamber 60 which is constantly connected by way of a passage 62 with the passage 13 in the pipe bracket section 7 and thereby through the branch pipe 14 to the brake pipe 1. An accelerated release check valve 64 is mounted in the chamber 60 and is yieldingly urged by means of a spring 66 into engagement with a seat rib 68, while a ball check valve 70 is mounted in the chamber within the seat rib 68 and is adapted to engage a seat formed on the body surrounding a passage 72 which communicates with a port in the seat of the main slide valve 18.

The body of the emergency portion 8 also has a bore therein in which is mounted a vent valve piston 76 having at one side thereof a chamber 78 which is constantly connected by way of a passage 80 with a port in the seat of the main slide valve 18.

The chamber on the other face of the piston 76 is open to the atmosphere by way of a passage 82, while the body has a groove 84 cut therein, which, in one position of the piston 76, extends around the piston so as to permit communication between the chamber 78 and the chamber on the opposite face of the piston 76.

The piston 76 has a passage 86 extending therethrough so as to permit fluid to flow from the chamber 78 to the chamber on the opposite face of the piston and thence to the atmosphere by way of the passage 82. The passage 86 has a choke 88 interposed therein to restrict the rate of flow of fluid from the chamber 78.

The body of the emergency valve portion has secured in a groove therein adjacent the vent valve piston a sealing gasket 90 having formed thereon an annular seat rib 92 which is adapted to be engaged by a face of the piston 76 to cut off communication from the chamber 78 around the periphery of the piston 76.

The piston 76 has formed integral therewith a stem 94 which has secured thereon a vent valve 96, which is mounted in a chamber 97 formed in the body of the emergency portion 8, and which is adapted to engage a seat rib 98 formed on the body of the emergency portion 8. The chamber 97 in which the valve 96 is mounted is connected by way of a passage 99 with the passage 62 and thereby with the passage 13 in the pipe bracket section 7 to which is connected the branch pipe 14 leading to the brake pipe 1, while the valve 96 is yieldingly urged by means of the spring 100 into engagement with the seat rib 98.

The emergency portion shown in this application incorporates means to control the supply of fluid under pressure from the brake pipe to the valve chamber 16 and the pressure chamber 17 and to also control the release of fluid under pressure from the valve chamber 16 and the pressure chamber 17. This means comprises a valve device indicated generally by the reference numeral 102.

The valve device 102 forms no part of this invention, but is the invention of H. R. Feuhrer, and is shown and claimed in his application Serial No. 88,075, filed June 30, 1936.

The valve device 102 comprises a valve 104 which is mounted in a chamber 106 which is constantly connected by way of a passage 108 with the valve chamber 16 and the pressure chamber 17. The valve 104 is yieldingly held away from the seat rib 110 surrounding a chamber 112 by means of a spring 114.

The valve 104 is adapted to be moved to the seated position by means of a diaphragm 116 which is subject on one side to the pressure of the fluid in the chamber 106 and on the other side to the pressure of the fluid in a chamber 118. The diaphragm 116 is engaged on one face by the head of a plunger 120 having a bore therein in which is mounted a spring seat 122 carrying a stem 124 which engages the valve 104. The spring seat 122 is engaged by a spring 126, while movement of the spring seat 122 by the spring 126 is limited by engagement of the spring seat with a shoulder 128 on the plunger 120. The spring 126 is proportioned so as to be able to transmit substantially greater force to the valve 104 than is exerted by the spring 114 so that the valve 104 may be moved by the spring 126 against the spring 114 to the seated position. The spring 126 provides a yielding force transmitting means, whereby the valve 104 is held seated with a substantially constant pressure regardless of the extent of movement of the diaphragm 116.

The body of the emergency valve portion 8 has projections 129 formed thereon and extending into the chamber 118 and adapted to be engaged by a face of the diaphragm 116 to limit movement of the diaphragm in one direction, while the head of the plunger 120 is adapted to engage shoulders 130 on the body of the valve portion to limit movement of the plunger 120 and the diaphragm 116 in the other direction.

The emergency portion provided by this invention has valve means indicated generally by the reference numeral 132 for controlling the supply of fluid under pressure from the brake pipe to the valve chamber 16 and the pressure chamber 17. As shown in the drawings, the valve means 132 comprises a diaphragm 134 which is urged into engagement with a seat rib 136 by means of a spring 138 mounted in a chamber 140 which is constantly connected with the atmosphere by way of a passage 142, a spring seat 139 being interposed between the spring 138 and the diaphragm 134.

The chamber 144 within the seat rib 136 is constantly connected by way of a passage 146 with the chamber 118 at the face of the diaphragm 116, and is connected by way of a passage 148 with a port in the bore in the body of the valve portion in which the piston 10 is mounted. The passage 148 has a choke 150 interposed therein.

The chamber 152 outwardly of the seat rib 136 is connected by way of a passage 154 with the chamber 112, while a passage 156, having a choke 158 interposed therein, communicates with the passage 154 and with the passage 108 leading to the valve chamber 16 and the pressure chamber 17. The choke 158 is of substantially smaller flow capacity than the choke 150.

The emergency valve portion shown in Fig. 1 of the drawings is shown in the normal release position, which is the position which it assumes when the brake equipment is fully charged. When the brake equipment is at atmospheric pressure the diaphragm 134 is held in engagement with the seat rib 136 by the spring 138, while the other parts of the emergency valve portion may be in the position in which they are shown in the drawings.

In initially charging the equipment fluid under pressure is supplied to the brake pipe 1 and it flows therefrom through the branch pipe 14 to the passage 13 and to the chamber 12 on the face of the piston 10.

Fluid under pressure supplied to the passage 13 also flows to the service portion (not shown) of the brake controlling valve device 5, and causes the piston of this portion to move to the release position in which the brake cylinder 2 is connected to the atmosphere, and in which a communication is opened through which fluid under pressure may flow from the passage 13 to the auxiliary reservoir (not shown) and to the emergency reservoir 4 to charge these reservoirs with fluid under pressure.

Fluid under pressure supplied by the service portion of the brake controlling valve device to the emergency reservoir 4 flows by way of the passage 44 to the chamber 42 on the face of the diaphragm 40 and increases the force exerted through the stem 38 to maintain the main slide valve 18 in engagement with its seat.

Fluid under pressure supplied to the passage 44 also flows to the chamber 48, but, as the check valve 50 is maintained in the seated position by the spring 52, fluid under pressure cannot flow from the chamber 48 to the valve chamber 16.

Fluid under pressure supplied from the brake pipe 1 to the passage 13 flows therethrough to the chamber 12 on the face of the piston 10 of the emergency valve portion 8, and on an increase in the pressure of the fluid in this chamber the piston 10 will be moved to the left, as viewed in Fig. 1 of the drawings, to the normal release position, if it is not already in that position, which is the position in which it is shown in this figure of the drawings. On movement of the piston 10 to the normal release position, communication is opened between the chamber 12 and the passage 148 through the choke 150 and fluid under pressure will flow to the chamber 144 on the face of the diaphragm 134, which at this time is held in engagement with the seat rib 136 by the spring 138. The spring 138 is of such value, and the chamber 144 within the seat rib 136 is of such area, that the diaphragm 134 is held in engagement with the seat rib 136 until the pressure of the fluid in the chamber 144 within the seat rib 136 has increased to a predetermined value.

On an increase in the pressure of the fluid in the chamber 144 fluid under pressure flows therefrom by way of the passage 146 to the chamber 118 on the face of the diaphragm 116.

On a predetermined increase in the pressure of the fluid in the chamber 118 the diaphragm 116 is moved upwardly, as viewed in the drawings, thereby moving the plunger 120 upwardly, and this movement of the plunger 120 is transmitted through the spring 126 to the spring seat 122 to press the stem 124 against the valve 104 and move this valve against the spring 114 into engagement with the seat rib 110. On movement of the valve 104 to the seated position, and on further movement of the plunger 120, the spring 126 is compressed and the plunger 120 is moved relative to the spring seat 122. The plunger 120 may continue to move in this direction until the head of the plunger 120 engages the shoulders 130 on the body of the emergency valve portion 8.

The increase in the pressure of the fluid in the chamber 144 will be accompanied by a similar increase in the pressure of fluid in the chamber 12 on the face of the piston 10 and the fluid under pressure in this chamber exerts a force on the piston 10 tending to move it to the left, as viewed in Fig. 1 of the drawings, to the normal release position.

The spring 138 and the other portions of the valve means 132 are proportioned so as to maintain the diaphragm 134 in engagement with the seat rib 136, and thereby prevent the flow of fluid under pressure from the brake pipe to the valve chamber 16 and the pressure chamber 17, until the pressure of the fluid in the chamber 12 on the face of the piston 10 has increased to a value such that the force exerted on the piston 10 will cause full movement of the piston 10 to fully open the port through which the passage 148 communicates with the chamber 12.

Movement of the piston 10 farther to the left, as viewed in the drawings, from the normal release position to the inner release position is resisted by the spring 36 acting through the plunger 30 which is engaged by the shoulder 32 on the piston stem 22 and by the projection 34 on the main slide valve 18. The various parts of the valve portion provided by this invention are arranged, however, so that the spring 36 and the plunger 30 are not effective to oppose movement of the piston 10 in this direction until the piston 10 has moved to a position to completely open the port through which the passage 148 communicates with the chamber 12 on the face of the piston 10.

When the pressure of the fluid in the chamber 144 on the face of the diaphragm 134 has increased to a predetermined relatively high value the force exerted by the fluid under pressure in the chamber 144 on the diaphragm 134 is sufficient to overcome the opposing force of the spring 138, and the diaphragm 134 will be moved away from the seat rib 136 so as to permit fluid under pressure to flow from the chamber 144 past the seat rib 136 to the chamber 152 outwardly of the seat rib 136.

When the diaphragm 134 is moved away from the seat rib 136 and fluid under pressure is supplied to the chamber 152 outwardly of the seat rib 136 the entire area of the face of the diaphragm 134 is subject to the pressure of the fluid in the chambers 144 and 152, and the force exerted by this fluid under pressure on the diaphragm 134 will be substantially greater than that exerted by the fluid under pressure in chamber 144 within the seat rib 136. As soon as the diaphragm 134 is moved away from the seat rib 136, therefore, there is a substantial increase in the force exerted by the fluid under pressure on this diaphragm, and the diaphragm is thereafter moved very quickly against the spring 138 until the spring seat 139 engages a portion of the body of the emergency valve 8 to prevent further movement of the diaphragm 134 against the spring 138.

On the supply of fluid under pressure to the chamber 152 outwardly of the seat rib 136, fluid under pressure flows therefrom by way of the passage 154 to the chamber 112 on the spring side of the valve 104. However, at this time the valve 104 is held in the seated position by the diaphragm 116 acting through the plunger 120 and fluid under pressure cannot flow from the chamber 112 past the seat rib 110 to the chamber 106.

Fluid under pressure supplied to the passage 154 flows therefrom to the passage 156 and through the choke 158 to the passage 108 through which it flows to the chamber 106 on the face of the diaphragm 116, and to the valve chamber 16 and by way of the passage 15 to the pressure chamber 17 to increase the pressure of the fluid in these chambers.

The choke 158 is proportioned so as to restrict the rate of flow of fluid from the chamber 12 to the valve chamber 16 and the pressure chamber 17 to a very slow rate so that there will be a slow increase in the pressure of the fluid in these chambers. As a result, the pressure of the fluid in the chamber 12 on the face of the piston 10 will increase more rapidly than the pressure of the fluid in the chamber 16 on the opposite side of the piston 10 so that there will be a constantly increasing difference between the pressures in the chambers 12 and 16 on the opposite sides of the piston 10. There will, therefore, be a constantly increasing force exerted on the piston 10 and tending to move it to the left, as viewed in the drawings, against the opposing force of the spring 36, and the piston 10 will be moved in this direction against the spring 36 to the inner release position.

After a time interval the pressure of the fluid in the valve chamber 16 and in the pressure chamber 17 will have increased by the flow of fluid thereto through the choke 158 to a value such that the force exerted by the fluid under pressure in the valve chamber 16, together with the force exerted by the spring 36 acting through the plunger 30, will be able to overcome the opposing force exerted on the piston 10 by the fluid under pressure in the chamber 12.

When the pressure of the fluid in the chamber 16 has increased to this value the piston 10 will be moved to the right, as viewed in the drawings, from the inner release position to the normal release position by the fluid under pressure in the chamber 16, and by the spring 36 acting through the plunger 30. When the piston 10 has been moved to the normal release position the plunger 30 engages a portion of the body of the emergency valve portion 8 so that the spring 36 is no longer effective to assist movement of the piston 10, and further movement of the piston 10 by the fluid under pressure in the valve chamber 16 will be opposed by the higher pressure in the chamber 12. The plunger 30 engages the projection 34 on the main slide valve 18 and on this movement of the plunger 30 by the spring 36 the main slide valve 18 is moved on its seat.

The plunger 30 engages a portion of the body of the emergency portion 8 so as to prevent further movement of the piston 10 by the spring 36 before the piston 10 has been moved to a position to restrict communication through the port through which the passage 148 communicates with the chamber 12 on the face of the piston 10. The piston 10, therefore, will be maintained in a position to permit unrestricted communication through the port leading from the chamber 12 to the passage 148.

After the piston 10 has been moved from the inner release position to the normal release position, which is the position in which it is shown in the drawings, fluid under pressure continues to flow from the chamber 12 on the face of the piston 10 through the choke 150 to the passage 148 leading to the chamber 144, thence past the seat rib 136 to the chamber 152 outwardly of the seat rib 136, and therefrom by way of the passage 154 to the passage 156 and through the choke 158 to the passage 108 leading to the valve chamber 16 and the pressure chamber 17 and to the chamber 106 and increases the pressure of the fluid in these chambers until the pressures therein have substantially equalized with the pressure of the fluid in the chamber 12.

If the pressure of the fluid in the valve chamber 16 increases more rapidly than the pressure of the fluid in the emergency reservoir 4, fluid under pressure will flow from the valve chamber 16 through the passage 58 and past the ball check valve 56 to the chamber within the seat rib 54 and it will move the spill-over check valve 50 away from the seat rib 54 against the spring 52 and the pressure of the fluid in the chamber 48 so as to permit fluid under pressure to flow to the chamber 48. Fluid under pressure supplied to the chamber 48 flows therefrom by way of the passage and pipe 44 to the emergency reservoir 4.

When the pressure of the fluid in the valve chamber 16 has reduced substantially to the pressure of the fluid in the emergency reservoir 4 the spill-over check valve 50 is moved to the seated position by the spring 52 to cut off the flow of fluid from the valve chamber 16 to the emergency reservoir and to prevent back flow of fluid from the emergency reservoir 4 to the valve chamber 16.

On an increase in the pressure of the fluid in the chamber 106 on the face of the diaphragm 116, there is an increase in the force exerted by the fluid in this chamber on the diaphragm 116 and opposing the force exerted by the fluid under pressure in the chamber 118 on the opposite face of the diaphragm 116. When the pressure of the fluid in the chamber 106 has increased approximately to the pressure of the fluid in the chamber 118 on the opposite face of the diaphragm 116, which is substantially at the same pressure as the fluid in the chamber 12 on the face of the piston 10, the force exerted by the fluid under pressure in the chamber 106, supplemented by the force exerted by the spring 126 acting through the plunger 120, will be sufficient to overcome the opposing force of the fluid under pressure in the chamber 118 and the diaphragm 116 will be moved downwardly, as viewed in Fig. 1 of the drawings, thereby permitting the spring 126 to expand.

The spring 126 will expand until the spring seat 122 engages the shoulder 128 on the plunger 120, and it will thereafter be ineffective to exert force on the diaphragm 116 and tending to move the diaphragm against the opposing force of the fluid under pressure in the chamber 118.

However, the spring 114 is now effective to assist movement of the diaphragm 116 against the opposing force of the fluid under pressure in the chamber 118, but the spring 114 is substantially weaker than the spring 126 and exerts substantially less force than the spring 126 exerted.

On a slight further increase in the pressure of the fluid in the chamber 106, which is at substantially the same pressure as the fluid in the chambers 16 and 17, the force exerted by the fluid under pressure in the chamber 106 supplemented by the force exerted by the spring 114 acting through the valve 104 and the spring 126 will be sufficient to move the diaphragm 116 against the opposing force of the fluid under pressure in the chamber 118, and the diaphragm 116 will thereupon be moved downwardly into engagement with the projections 129.

On this movement of the diaphragm 116 the stem 124 of the spring seat 122 is moved downwardly, thereby permitting the spring 114 to move the valve 104 away from the seat rib 110 and permit fluid under pressure supplied by the valve means 132 to the passage 154 and therefrom to the chamber 112 within the seat rib 110 to flow past the seat rib 110 to the chamber 106 and thence by way of the passage 108 to the chambers 16 and 17.

When the valve 104 is moved away from the seat rib 110 fluid under pressure may flow at a rapid rate from the chamber 112 to the chamber 106 and thence by way of the passage 108 to the chambers 16 and 17, with the result that the pressure of the fluid in the chambers 16 and 17 will quickly equalize with the pressure of the fluid in the chamber 12 on the face of the piston 10.

Upon a subsequent reduction in the pressure of the fluid in the brake pipe 1 at a service rate to effect a service application of the brakes, the service portion (not shown) of the brake controlling valve device operates as described in detail in the above identified patent to close the communication through which fluid under pressure is supplied from the brake pipe 1 to the auxiliary reservoir (not shown) and to the emergency reservoir 4. In addition, the service portion operates to supply fluid under pressure from the auxiliary reservoir to the brake cylinder 2 until the pressure of the fluid in the auxiliary reservoir is reduced substantially to the pressure at which the pressure in the brake pipe is reduced.

On a reduction in the pressure of the fluid in the brake pipe at a service rate, fluid under pressure flows from the valve chamber 16 and the pressure chamber 17 to the chamber 12 on the face of the piston 10 by way of the passage 108 to the chamber 106 and thence past the seat rib 110 to the chamber 112 from which the fluid flows by way of the passage 154 to the chamber 152 outwardly of the seat rib 136. At this time the diaphragm 134 is held away from the seat rib 136 by the fluid under pressure in the chambers 144 and 152 on opposite sides of the seat rib 136, so that fluid under pressure will flow from the chamber 152 past the seat rib 136 to the chamber 144 within the seat rib 136 and thence by way of the passage 148 and through the choke 150 to the chamber 12 on the face of the piston 10.

The choke 150 is proportioned to permit fluid under pressure to flow from the chambers 16 and 17 at a rate which enables the pressure of the fluid in the chambers 16 and 17 to be reduced substantially as rapidly as the pressure of the fluid in the chamber 12 on the face of the piston 10 is reduced during a reduction in brake pipe pressure at a service rate.

As the pressure of the fluid in the chambers 16 and 17 is reduced by the flow of fluid therefrom to the brake pipe substantially as rapidly as the pressure of the fluid in the chamber 12 is reduced during a reduction in the pressure of the fluid in the brake pipe at a service rate, no differential will be developed in the pressure of the fluid in the chambers on opposite sides of the piston 10, and the piston 10 will, therefore, remain in the normal release position.

The pressure of the fluid in the brake pipe will not be reduced to atmosphere during a service application of the brakes, but will be maintained at a substantial value. The fluid under pressure in the chambers 144 and 152 on the face of the diaphragm 134 will be at the pressure of the fluid in the brake pipe, and this pressure is exerted over the entire face of the diaphragm 134 and is sufficient to overcome the opposing force of the spring 138 and maintain the diaphragm 134 away from the seat rib 136.

Since the diaphragm 116 of the valve device 120 is subject to the opposing pressures of the fluid in the chambers 106 and 118, which communicate with the valve chamber 16 and the brake pipe respectively, the valve 104 will be held away from the seat rib 110 by the spring 114 during a service reduction in brake pipe pressure, because as just described, the fluid pressure in the valve chamber 16 is reduced at substantially the same rate as the brake pipe pressure is reduced.

On a subsequent increase in the pressure of the fluid in the brake pipe to effect the release of the brakes, the service portion (not shown) of the brake controlling valve device 5 operates as described in detail in the above identified patent to release fluid under pressure from the brake cylinder 2 and to open a communication through which fluid under pressure is supplied from the brake pipe to the auxiliary reservoir (not shown) and to the emergency reservoir 4.

On this increase in the pressure of the fluid in the brake pipe there will be a similar increase in the pressure of the fluid in the chamber 12 on the face of the piston 10, and fluid under pressure will flow therefrom through the choke 150 to the passage 148 and therethrough to the chamber 144 on the face of the diaphragm 134 of the valve means 132. Fluid under pressure supplied to the chamber 144 will flow therefrom by way of the passage 146 to the chamber 118 on the face of the diaphragm 116 to increase the pressure of the fluid in this chamber.

Fluid under pressure supplied to the chamber 144 flows past the seat rib 136 to the chamber 152 and therefrom through the passage 154 to the chamber 112 and thence past the seat rib 110 to the chamber 106. Fluid under pressure supplied to the chamber 106 flows therefrom by way of the passage 108 to the valve chamber 16 and to the pressure chamber 17 to increase the pressure of the fluid in these chambers, while there will be a similar increase in the pressure of the fluid in the chamber 106 on the face of the diaphragm 116.

In addition, fluid under pressure supplied to the passage 154 will flow through the passage 156 and through the choke 158 to the passage 108 leading to the chambers 16 and 17.

The rate of increase in the pressure of the fluid in the brake pipe 1 and the chamber 12 on the face of the piston 10 during the release of the brakes after a service application of the brakes, and the rate of flow of fluid under pressure from the chamber 12 through the choke 150 to the chambers 16 and 17 are such that during normal operation of the brake equipment the pressure of the fluid in the chambers 16 and 17 will be increased substantially as rapidly as the pressure of the fluid in the chamber 12 is increased. As a result the differential between the pressure of the fluid in the chambers on opposite sides of the piston 10 during this increase in the pressure of the fluid in the brake pipe will be relatively small and the force exerted on the piston 10 by the fluid under pressure in the chamber 12 will not exceed the opposing force exerted on the piston 10 by the fluid under pressure in the chamber 16 by an amount sufficient to move the piston 10 against the spring 36. The piston 10, therefore, will not be moved to the inner release position, but will remain in the normal release position.

Fluid under pressure supplied to the chamber 144 will flow past the seat rib 136 to the chamber 152 and therefrom by way of the passage 154 to the chamber 112 from which it will flow past the seat rib 110 at a rapid rate to the chamber 106 and thence by way of the passage 108 to the chambers 16 and 17.

As fluid under pressure is supplied from the chamber 144 to the chambers 106 and the chambers 16 and 17 at a rapid rate the pressure of the fluid in the chamber 106 will be increased substantially as rapidly as the pressure of the fluid in the chamber 118 is increased by the flow of fluid thereto from the chamber 144 by way of the passage 146.

As pressures in the chambers 106 and 118 on opposite sides of the diaphragm 116 of the valve device 102 are substantially equal, substantially no force will be exerted on the diaphragm 116 and tending to move the valve 104 against the spring 114 into engagement with the seat rib 110. As a result, therefore, the spring 114 will maintain the valve 104 away from the seat rib 110 so as to permit fluid under pressure to flow from the chamber 112 to the chamber 106 at a rapid rate, and therefrom by way of the passage 108 to the chambers 16 and 17.

On a reduction in the pressure of the fluid in the brake pipe 1 at an emergency rate to effect an emergency application of the brakes, the service portion (not shown) of the brake controlling valve device 5 operates as described in detail in the above identified patent to close the communication through which fluid under pressure is supplied from the brake pipe 1 to the auxiliary reservoir (not shown) and to the emergency reservoir 4, and to supply fluid under pressure from the auxiliary reservoir (not shown) to the brake cylinder 2.

When the brake pipe pressure is reduced at an emergency rate, there will be a back flow of fluid from the valve chamber 16 to the brake pipe by way of the passage 148 and the choke 150, as in a service reduction in brake pipe pressure, but since the brake pipe pressure is now being reduced at an emergency rate, the pressure on the brake pipe side of the piston 10 will reduce more rapidly than the pressure in the valve chamber 16 can reduce by flow through the restricted port 150, and as a result, a differential pressure is created in the valve chamber 16 which causes the piston 10 to be shifted relative to the main slide valve 18 against the opposing force of the spring 26 acting through the plunger 24.

On this movement of the piston 10 and the stem 22 the auxiliary slide valve 20 is moved relative to the main slide valve 18 and uncovers a port 156 through the main slide valve 18 which communicates with the passage 80 leading to the chamber 78 on the face of the vent valve piston 76. When the auxiliary slide valve 20 is moved to a position to uncover the port 156 through the main slide valve 18 fluid under pressure from the chamber 16 flows through the port 156 to the passage 80 and therethrough to the chamber 78 on the face of the vent valve piston 76. The rate of flow of fluid under pressure through the passage 80 to the chamber 78 is substantially more rapid than the rate at which fluid under pressure may escape from the chamber 78 through the groove 84 around the piston 76 and through the choke 88 in the passage 86. As a result there will be a rapid increase in the pressure of the fluid in the chamber 78 and the vent valve piston 76 will be moved to the right, as viewed in the drawings, and this movement of the piston 76 will be transmitted through the stem 94 to move the vent valve 96 away from the seat rib 98 against the opposing force of the spring 100 and of the fluid under pressure in the chamber 97.

On this movement of the piston 76 the face of the piston is moved into engagement with the seat rib 92 on the gasket 90 so as to prevent the escape of fluid under pressure from the chamber 78 around the periphery of the piston.

On movement of the vent valve 96 away from the seat rib 98 a relatively large opening is provided through which fluid under pressure supplied from the brake pipe 1 by way of the branch pipe 14, and the passages 13, 62 and 99 to the chamber 97 may escape to the atmosphere by way of the atmospheric passage 82. There will, therefore, be a rapid reduction in the pressure of the fluid in the brake pipe, and also in the chamber 12 on the face of the piston 10, as this chamber communicates with the passage 13.

On this sudden reduction in the pressure of the fluid in the chamber 12 there will be rapid decrease in the force exerted on the piston 10 and opposing movement of this piston by the fluid under pressure in the chamber 16, and the piston 10 and the stem 22 will thereafter be moved to the right, as viewed in the drawings, very rapidly by the fluid under pressure in the chamber 16.

The piston 10 and the stem 22 are moved to the right, as viewed in the drawings, until the face of the piston engages the face of the gasket 160 which is clamped between the emergency portion 8 and the pipe bracket section 7. This is the emergency application position of the piston 10.

On movement of the piston 10 and the stem 22 a short distance towards the application position a shoulder 158 on the piston stem 22 engages the end of the main slide valve 18 so that on further movement of the piston 10 and the stem 22 towards the application position the main slide valve 18 is moved upon its seat and uncovers the end of the passage 80 so as to permit fluid under pressure in the chamber 16 to continue to flow to the passage 80 and therethrough to the chamber 78 on the face of the vent valve piston 76.

Upon movement of the piston 10 to emergency position, the main slide valve 18 is moved so that a cavity 162 therein establishes communication between a port in the seat of the slide valve to which is connected the passage 44 leading from the emergency reservoir 4, and a passage 164 leading to the brake cylinder 2, so that fluid under pressure will now flow from the emergency reservoir 4 to the brake cylinder 2.

Fluid under pressure supplied to the chamber 78 at the face of the vent valve piston 76 will be vented therefrom at a restricted rate through the choke 88 and the passage 86 through the piston 76. The volume of the chambers 16 and 17 and the rate of flow of fluid under pressure through the choke 88 are proportioned so as to maintain the pressure of the fluid in the chamber 78 at a value sufficient to hold the piston 76 in engagement with the seat rib 92 against the opposing force of the spring 100, and thereby hold the vent valve 96 away from the seat rib 98, until the pressure of the fluid in the brake pipe 1 has been reduced to atmospheric pressure or substantially to atmospheric pressure.

When the pressure of the fluid in the chamber 78 has been reduced to a relatively low value by the venting of fluid under pressure therefrom through the choke 88 and passage 86, the force exerted by this fluid on the piston 76 is insufficient to maintain this piston against the opposing force of the spring 100 acting through the vent valve 96 and the stem 94, and the spring 100 will thereupon move the vent valve 96 into engagement with the seat rib 98, while the piston 76 will be moved away from the seat rib 92 to the position in which it is shown in the drawings, in which position the groove 84 extends around the piston 76. When the piston 76 is moved to this position any fluid under pressure remaining in the chambers 16 and 17 and in the chamber 78 on the face of the piston 76 can escape therefrom at a rapid rate through the groove 84 around the piston 76 and thence to the atmosphere by way of the passage 82. The chambers 16 and 17, therefore, will be reduced substantially to atmospheric pressure.

On movement of the piston 10 to the application position the passage 148 is in communication with the chambers 16 and 17, and on a reduction in the pressure of the fluid in these chambers to atmospheric pressure the fluid in the chambers 144 and 152 on the face of the diaphragm 134 of the valve means 132 will be reduced to atmospheric pressure, and the diaphragm 134 will be moved into engagement with the seat rib 136 by the spring 138.

In addition, when the pressure of fluid in the chambers 16 and 17 is reduced to atmospheric pressure the fluid in the chambers 106 and 118 on opposite sides of the diaphragm 116 will be at atmospheric pressure also, and as the pressure on the opposite sides of the diaphragm 116 is equal, the valve 104 will be held away from the seat rib 110 by the spring 114, while the diaphragm 116 will be held in engagement with the stops or projections 129.

On a subsequent increase in the pressure of the fluid in the brake pipe 1 to effect the release of the brakes, fluid under pressure flows therefrom by way of the branch pipe 14 to the passage 13 and to the chamber 12 on the face of the piston 10. When the pressure of the fluid in the chamber 12 has increased to a predetermined relatively low value the force exerted by this fluid under pressure on the piston 10, together with the force exerted by the spring 26 acting through the piston stem 22, is sufficient to cause the piston 10 to move away from the gasket 166. On this movement of the piston 10 the piston, the stem 22 and the auxiliary slide valve 20 are moved relative to the main slide valve 18 and the auxiliary slide valve 20 is moved to a position to cover the end of the passage 156 through the main slide valve 18.

On a further increase in the pressure of the fluid in the chamber 12 on the face of the piston 10, the piston 10 is moved farther to the left, as viewed in the drawings, and on this movement of the piston 10 the main slide valve 18 is moved upon its seat and is moved to a position in which the cavity 162 therein no longer establishes communication between the passage 44 leading from the emergency reservoir 4, and the passage 164 leading to the brake cylinder 2, so that communication between the emergency reservoir 4 and the brake cylinder 2 is cut off.

In addition on this movement of the main slide valve 18 the end of the slide valve covers the end of the passage 80 to cut off communication between the valve chamber 16 and the passage 80, while the slide valve 18 is moved to a position in which the port 156 through the slide valve communicates with the passage 80.

After a certain amount of movement of the piston 10 it will be moved to a position to open communication between the chamber 12 and the port through which fluid under pressure is supplied from the chamber 12 through the choke 150 to the passage 148 leading to the chamber 144 on the face of the diaphragm 134 of the valve means 132. Fluid under pressure supplied to the chamber 144 will flow therefrom through the passage 146 to the chamber 118 on the face of the diaphragm 116, and on a predetermined increase in the pressure of the fluid in the chamber 118 the diaphragm 116 will be forced upwardly and its movement will be transmitted through the plunger 120 and the spring 126 to the spring seat 122 and through the stem 124 to the valve 104 to move this valve into engagement with the seat rib 110 against the spring 114.

Fluid under pressure supplied from the brake pipe through passage 148 acts on the area of the diaphragm 134 within the seat rib 136, and when the brake pipe pressure has been increased to a predetermined degree sufficient to overcome the pressure of spring 138, the diaphragm 134 will be moved from its seat so as to open communication from the brake pipe to the valve chamber 16 by way of the restricted port 158.

Since fluid under pressure cannot flow from the brake pipe to the valve chamber 16 until the diaphragm 134 is unseated, and as the pressure in the brake pipe must be increased to a substantial value before the diaphragm 134 is unseated, it will be seen that a differential pressure is built up in the brake pipe which insures movement of the piston 10 to fully open the port leading from the chamber 12 to the choke 150 and the passage 148.

The choke 158 is of much smaller flow capacity than the choke 150 and is proportioned so as to permit fluid to flow therethrough only at a relatively slow rate, and as a result, there will be a relatively slow increase in the pressure of the fluid in the chambers 16 and 17 and 106.

During the release of the brakes after an emergency application of the brakes, the pressure of the fluid in the brake pipe 1 will be increased at a relatively rapid rate and there will be a corresponding rapid increase in the pressure of the fluid in the chamber 12. As the pressure of the fluid in the chamber 12 on the face of the piston 10 increases at a relatively rapid rate, and as the pressure of the fluid in the chamber 16 on the opposite face of the piston 10 can only increase at a relatively slow rate because of the restricted rate of flow of fluid under pressure through the choke 158, there will be a gradually increasing differential between the pressure of the fluid in the chamber 12 and the pressure of the fluid in the chamber 16.

As a result there will be a corresponding gradual increase in the force tending to move the piston 10 to the left, and when the difference between the pressures of the fluid in the chambers 12 and 16 increases to a predetermined value, the force exerted on the piston 10 by the fluid under pressure in the chamber 12 will exceed the opposing force exerted by the fluid under pressure in the chamber 16 on the opposite face of the piston 10 by an amount sufficient to move the piston 10 against the opposing force of the spring 36 acting through the plunger 30.

The piston 10 will thereupon be moved from the normal release position to the inner release position against the spring 36 and will move the main slide valve 18 to a position in which the cavity 162 establishes communication between the passage 164 and the passage 72.

Fluid under pressure will thereupon flow from the brake cylinder 2 and the auxiliary reservoir (not shown) by way of the pipe and passage 164 and the cavity 162 in the main slide valve 18 to the passage 72, and through this passage past the ball check valve 70 to the chamber within the seat rib 68. On an increase in the pressure of the fluid in the chamber within the seat rib 68, the accelerated release check valve 64 will be moved away from the seat rib 68 against the opposing force of the spring 66 and of the fluid under pressure in the chamber 60, which at this time will be at a relatively low value, and fluid under pressure will flow to the chamber 60 and thence by way of the passage 62 to the passage 13, which communicates with the chamber 12 on the face of the piston 10, and with the branch pipe 14 leading to the brake pipe 1 so as to increase the pressure of the fluid in the brake pipe and in the chamber 12.

When the pressure of the fluid in the brake cylinder 2 and the auxiliary reservoir (not shown) and in the brake pipe 1 have substantially equalized by the flow of fluid under pressure from the brake cylinder and the auxiliary reservoir to the brake pipe the accelerated release check valve 64 is moved into engagement with the seat rib 68 by the spring 66 so as to cut off the further flow of fluid under pressure from the brake cylinder to the brake pipe, and to prevent back flow of fluid under pressure from the brake pipe 1 to the brake cylinder 2.

During the time that the piston 10 and the main slide valve 18 are in the inner release position fluid under pressure continues to flow from the chamber 12 through the choke 158 to the chambers 16 and 17, and after a time interval the pressure of the fluid in the chambers 16 and 17 will have increased to a value such that the force exerted on the piston 10 by the fluid under pressure in the chamber 16, together with the force exerted by the spring 36 acting through the plunger 30, is sufficient to overcome the opposing force exerted on the piston 10 by the fluid under pressure in the chamber 12. The piston 10 and the main slide valve 18 will thereupon be moved by the spring 36 acting through the plunger 30, and by the fluid under pressure in the chamber 16 acting on the piston 10, to the right, as viewed in the drawings, from the inner release position to the normal release position. The plunger 30 is able to move the main slide valve 18 at this time as the plunger 30 is engaged by the projection 34 on the main slide valve.

When the piston 10 and the main slide valve 18 have been moved to the normal release position the plunger 30 engages a portion of the body of the emergency portion 8 which prevents further movement of the plunger 30 with the result the spring 36 is no longer effective to exert force upon the piston 10 and the stem 22, or on the main slide valve 18, and the higher pressure of the fluid in the chamber 12 on the face of the piston 10 prevents further movement of the piston 10 by the fluid under pressure in the valve chamber 16.

The rate of flow of fluid under pressure through the choke 158 is such that the pressure of the fluid in the chambers 16 and 17 will not have increased to a value sufficient to cause the piston 10 and the main slide valve 18 to move from the inner release position to the normal release position until after the piston 10 and the main slide valve 18 have been in the inner release position for a period of time long enough to permit the fluid under pressure from the brake cylinder 2 and in the auxiliary reservoir to flow to the brake pipe 1 and substantially equalize the pressure of the fluid in the brake cylinder and auxiliary reservoir and in the brake pipe.

After movement of the piston 10 to the normal release position fluid under pressure continues to flow from the chamber 12 through the choke 158 to the passage 148 and thence to the chamber 144 from which it flows past the seat rib 136 to the chamber 152 and therefrom by way of the passage 154 to the passage 156 and through the choke 158 to the passage 108 leading to the chambers 16 and 17.

In addition, fluid under pressure supplied to the passage 108 flows to the chamber 106 on one side of the diaphragm 116 of the valve device 102, while the diaphragm 116 is subject on the other side to the pressure of the fluid in the chamber 118. The chamber 118 is connected by way of the passage 146 with the chamber 144 which communicates with the chamber 12 and thereby with the brake pipe 1 through the passage 148 and the choke 150 of relatively large flow capacity. The pressure of the fluid in the chamber 118, therefore, will be at substantially the pressure of the fluid in the chamber 12.

When the pressure of the fluid in the chamber 106 has increased to a value such that the difference between the pressure of the fluid in the chamber 106 and in the chamber 118 on the opposite face of the diaphragm 116 is less than a predetermined amount, the spring 126 will expand and will move the diaphragm 116 and the plunger 120 downwardly until the spring seat 122 engages the shoulder 128 on the plunger 120. On a further reduction in the differential between the pressure of the fluid in the chamber 106 and in the chamber 118, the spring 114 will move the valve 104 downwardly away from the seat rib 110 and this movement of the valve 104 will be transmitted through the spring 126 to move the diaphragm 116 into engagement with the projection 129.

After movement of the valve 104 away from the seat rib 110 fluid under pressure supplied to the passage 154 flows to the chamber 112 and then past the seat rib 110 to the chamber 106 and therefrom by way of the passage 108 to the chambers 16 and 17 to increase the pressure of the fluid in these chambers at a relatively rapid rate until the pressure of the fluid in these chambers has equalized with the pressure of the fluid in the chamber 12 and in the brake pipe 1.

If the pressure of the fluid in the valve chamber 16 increases to a value above the pressure of the fluid in the emergency reservoir 4, fluid under pressure will flow from the valve chamber 16 through the passage 58 and past the ball check valve 56 to the chamber within the seat rib 54 and it will move the spill-over check valve 50 away from the seat rib 54 against the spring 52 and the pressure of the fluid in the chamber 48 so as to permit fluid under pressure to flow to the chamber 48. Fluid under pressure supplied to the chamber 48 flows therefrom by way of the passage and pipe 44 to the emergency reservoir 4.

When the pressure of the fluid in the emergency reservoir 4 has increased substantially to the pressure of the fluid in the valve chamber 16, the spill-over check valve 50 is moved to the seated position by the spring 52 to cut off the flow of fluid under pressure from the valve chamber 16 to the emergency reservoir and to prevent back flow of fluid under pressure from the emergency reservoir 4 to the valve chamber 16.

On an increase in the pressure of the fluid the brake pipe 1 fluid under pressure flows therefrom by way of the branch pipe 14 to the passages in the pipe bracket section 7 and to the service portion (not shown) of the brake controlling valve device 5, and when the pressure of the fluid supplied from the brake pipe 1 to the service portion has increased to a value exceeding the pressure of the fluid in the auxiliary reservoir, the service portion operates as described in detail in the above identified patent to release fluid under pressure from the brake cylinder 2 and to open a communication through which fluid under pressure may be supplied from the brake pipe 1 to the auxiliary reservoir (not shown) and to the emergency reservoir 4.

In Fig. 2 of the drawings there is illustrated a part of a brake equipment employing a modified form of emergency portion embodying this invention. The emergency portion shown in Fig.

2 of the drawings is identical in construction and operation with the emergency portion shown in Fig. 1 of the drawings, except in certain particulars, as will hereinafter be described in detail, and identical reference numerals are employed for the emergency portion and other parts of the brake equipment shown in Fig. 2 of the drawings to identify the portions of the equipment which are also employed in the brake equipment shown in Fig. 1 of the drawings.

The emergency portion 8a shown in Fig. 2 of the drawings differs from the emergency portion 8 shown in Fig. 1 of the drawings in the construction of the valve means 132a, which controls the flow of fluid from the brake pipe to the chambers 16 and 17. As shown in Fig. 2 of the drawings, this valve means comprises a movable abutment in the form of a diaphragm 134a, which is yieldingly held in engagement with a seat rib 136 by means of a spring 138a acting through a plunger 162 carried by the diaphragm. The spring 138a is substantially stronger than the corresponding spring 136 employed in the emergency portion shown in Fig. 1 of the drawings. The spring 138a is mounted in a chamber 140a, which is constantly connected to the atmosphere through a choke 164.

The plunger 162 is hollow and has mounted therein a spring 166, which extends between the plunger and a flange 168 on a valve 170, which is adapted to engage a seat surrounding the end of a passage 172, which communicates with the passage 154, and thereby through the choke 158 with the valve chamber 16 and the pressure chamber 17. The flange 168 is adapted to engage an inwardly extending flange 174 on the plunger 162 to limit movement of the valve 170 by the spring 166.

The diaphragm 134a has secured on the other face thereof a plunger 176, which extends into the chamber 144 within the seat rib 136. The plunger 176 is hollow and has mounted therein a spring 178 which extends between the plunger and a valve 182, which is adapted to engage a seat surrounding the end of a passage 184 leading from the chamber 60 in which the accelerated release check valve 64 is mounted. The valve 182 carries a radially outwardly extending flange 180 which is adapted to engage an inwardly extending flange 186 on the plunger 176 to limit movement of the valve 182 by the spring 178.

The emergency portion 8a is shown in the drawings in the position which it assumes when the brake equipment is at atmospheric pressure, and with the piston 10 in the normal release position. At this time the diaphragm 116 of the valve device 102 is held in engagement with the projections 129, while the valve 104 is held away from the seat rib 110 by the spring 114.

In addition, at this time the diaphragm 134a of the valve means 132a is held in engagement with the seat rib 136 by the spring 138a, while the valve 182 is held in the seated position by the spring 178.

When the diaphragm 134a is in engagement with the seat rib 136, the valve 170 is held away from its seat so that the valve chamber 16 is connected to the atmosphere by way of the passage 108, choke 158, passages 156, 154 and 172, the chamber 140a, and the choke 164.

In initially charging the equipment fluid under pressure is supplied to the brake pipe 1, and it flows therefrom through the branch pipe 14 to the passage 13 in the pipe bracket section 7, and to the chamber 12 on the face of the piston 10.

Fluid under pressure supplied to the passage 13 also flows to the service portion, not shown, of the brake controlling valve device 5a and causes the piston of this portion to move to the release position in which the brake cylinder 2 is connected to the atmosphere, and in which a communication is opened through which fluid under pressure may flow from the passage 13 to the auxiliary reservoir, not shown, and to the emergency reservoir 4 to charge these reservoirs with fluid under pressure.

Fluid under pressure supplied by the service portion of the brake controlling valve device 5a to the emergency reservoir 4 flows by way of the passage 44 to the chamber 42 on the face of the diaphragm 40, and increases the force exerted through the stem 38 to maintain the main slide valve 18 in engagement with its seat.

Fluid under pressure supplied from the brake pipe 1 to the passage 13 flows to the chamber 12 on the face of the piston 10 of the emergency portion 8a and increases the pressure of the fluid in this chamber. On an increase in the pressure of the fluid in the chamber 12 the piston 10 will be moved to the left, as viewed in Fig. 2 of the drawings, to the normal release position, if it is not already in that position, which is the position in which it is shown in this figure of the drawings. On movement of the piston 10 to the normal release position communication is opened between the chamber 12 and the passage 148 through the choke 150 to the chamber 144 on the face of the diaphragm 134a, which at this time is held in engagement with the seat rib 136 by the spring 138a.

The spring 138a of such value, and the chamber 144 within the seat rib 136 is of such area, that the diaphragm 134a is held in engagement with the seat rib 136 until the pressure of the fluid in the chamber 144 within the seat rib 136 has increased to a relatively high predetermined value.

On the supply of fluid under pressure to the chamber 144, fluid under pressure flows therefrom by way of the passage 146 to the chamber 118 on the face of the diaphragm 116 of the valve device 102.

On a predetermined increase in the pressure of the fluid in the chamber 118, the diaphragm 116 is moved upwardly, as viewed in the drawings, thereby moving the plunger 120 upwardly, and this movement of the plunger is transmitted through the spring 126 to the spring seat 122 to press the stem 124 against the valve 104 and thereby move this valve against the spring 114 into engagement with the seat rib 110.

The increase in the pressure of the fluid in the chamber 144 will be accompanied by a similar increase in the pressure of the fluid in the chamber 12 on the face of the piston 10, and the fluid under pressure in this chamber exerts a force on the piston 10 tending to move it to the left, as viewed in Fig. 2 of the drawings. Movement of the piston 10 further to the left, as viewed in the drawings, from the normal release position to the inner release position is resisted by the spring 36 acting through the plunger 30, which is engaged by the shoulder 32 on the piston stem 22 and by the projection 34 on the main slide valve 18. The various parts of the emergency valve portion shown in this figure of the drawings, like that shown in Fig. 1 of the drawings, are arranged so that the spring 36 and the plunger 30 are not effective to oppose movement of the piston 10 in this direction until the piston 10 has been moved to a position to completely open the port through which the passage 148 communicates with the chamber 12 on the face of the piston 10.

When the pressure of the fluid in the chamber 12 has built up to a relatively high value it exerts sufficient force on the piston 10 to cause it to move against the spring 36 to the inner release position. If during the period in which the pressure of the fluid in the chamber 12 is being increased, any fluid under pressure should leak past the piston 10, and the packing ring 11 carried thereby, to the valve chamber 16, it will escape to the atmosphere by way of the passage 108, choke 158, passages 156, 154 and 172, and the valve means 132a.

The spring 138a, and the other portions of the valve means 132a, are arranged and proportioned so that the diaphragm 134a is held in engagement with the seat rib 136 until the pressure of the fluid in the chamber 144 within the seat rib 136, and therefore in the chamber 12 on the face of the piston 10, has increased to a value somewhat higher than is required to effect movement of the piston 10 against the spring 36 to the inner release position. As a result, no fluid under pressure will be supplied to the valve chamber 16 until after the piston 10 has been moved to the inner release position.

On an increase in the pressure of the fluid in the chamber 144 to a somewhat higher value than is required to effect movement of the piston 10 to the inner release position, the force exerted by the fluid under pressure in the chamber 144 on the area of the diaphragm 134a within the seat rib 136 is sufficient to overcome the opposing force of the spring 138a, and the diaphragm 134a will thereupon be moved upwardly, as viewed in Fig. 2 of the drawings, away from the seat rib 136.

As soon as the diaphragm 134a is moved away from the seat rib 136, fluid under pressure flows from the chamber 144 within the seat rib 136, to the chamber 152 outwardly thereof so that the entire face of the diaphragm 134a is subject to fluid under pressure. As a result of this increase in the area of the diaphragm 134a which is subject to fluid under pressure, there will be a substantial increase in the force exerted on the diaphragm 134a as soon as it is moved away from the seat rib 136, and it will thereafter be moved against the spring 138a very rapidly.

After a slight amount of upward movement of the diaphragm 134a, the inwardly extending flange 186 on the plunger 176 engages the flange 180 on the valve 182 so that upon further upward movement of the diaphragm 134a, the valve 182 is lifted away from the seat surrounding the end of the passage 184.

As soon as the valve 182 is lifted away from its seat fluid under pressure may flow from the chamber 144 through the passage 184 to the chamber 60 in which the accelerated release check valve 64 is mounted. At this time the accelerated release check valve 64 is held in the seated position by the spring 66 so as to prevent the flow of fluid from the chamber 60 to the chamber within the seat rib 68 and therefrom to the passage 72.

On a slight further upward movement of the diaphragm 134a, the valve 170 is moved to the seated position so as to cut off communication between the passage 172 and the chamber 140a. On further upward movement of the diaphragm 134a subsequent to movement of the valve 170 into engagement with its seat, the spring 166 is compressed and the plunger 162 is moved relative to the valve 170 until further movement of the diaphragm 134a is prevented by engagement of a portion of the plunger 162 with a portion of the body of the emergency portion 8a.

On movement of the diaphragm 134a away from the seat rib 136, and on the supply of fluid under pressure from the chamber 144 within the seat rib 136 to the chamber 152 outwardly thereof, fluid under pressure flows from the chamber 152 through the passage 154 to the chamber 112 within the seat rib 110 of the valve device 102. As the valve 104 is held in engagement with the seat rib 110 at this time, fluid under pressure will not flow from the chamber 112 to the chamber 106 in the valve device 102.

Fluid under pressure supplied to the passage 154 also flows to the passage 172, but as the valve 170 has been moved to the seated position, fluid under pressure will not flow from the passage 172 to the chamber 140a, from which it could escape to the atmosphere by way of the choke 164.

Fluid under pressure supplied to the passage 154 also flows therefrom to the passage 156, and through the choke 158 to the passage 108, through which it flows to the chamber 106 in the valve device 102, and to the valve chamber 16 and the pressure chamber 17 to increase the pressure of the fluid in these chambers. The choke 158 restricts the rate of flow of fluid to these chambers, and, as a result, there will be a slow rate of increase in the pressure of the fluid in these chambers.

After a time interval the pressure of the fluid in the valve chamber 16 will have increased to a value such that the force exerted on the piston 10 by this fluid under pressure, together with the force exerted by the spring 36, is sufficient to overcome the opposing force of the fluid under pressure in the chamber 12, and the piston 10 and the main slide valve 18 will thereupon be moved to the right, as viewed in Fig. 2 of the drawings, from the inner release position, towards the normal release position. After a certain amount of movement of the piston 10 to the right, the plunger 30 engages a portion of the body of the emergency portion 8a so that the spring 36 is no longer effective to assist movement of the piston 10, and the higher pressure of the fluid in the chamber 12 will prevent further movement of the piston 10 by the fluid under pressure in the chamber 16.

The various parts of this emergency valve portion, like those of the emergency valve portion shown in Fig. 1 of the drawings, are arranged and proportioned so that the plunger 30 engages a portion of the body of the emergency portion before the piston 10 has been moved to a position to restrict the rate of flow of fluid from the chamber 12 through the choke 150 to the passage 148.

After movement of the piston 10 from the inner release position to the normal release position, the pressure of the fluid in the valve chamber 16 continues to increase by the flow of fluid thereto from the chamber 12 through the choke 158 until the pressure of the fluid in the valve chamber 16 has substantially equalized with the pressure of the fluid in the chamber 12 on the opposite side of the piston 10.

On an increase in the pressure of the fluid in the valve chamber 16, there is a corresponding increase in the pressure of the fluid in the chamber 106 of the valve device 102. When the pressure of the fluid in the chamber 106 has increased approximately to the pressure of the fluid in the brake pipe, and consequently in the chamber 118 on the opposite face of the diaphragm 16, the force exerted by the fluid under pressure in the chamber 106, supplemented by the force exerted by the spring 126 acting through the plunger 120, will be sufficient to overcome the opposing force of the fluid under pressure in the chamber 118, and the diaphragm 116 will be moved downwardly, as viewed in Fig. 2 of the drawings, thereby permitting the spring 126 to expand.

The spring 126 will expand until the spring seat 122 engages the inwardly extending flange 128 on the plunger 120, and will thereafter be ineffective to exert force on the diaphragm 116 tending to move the diaphragm against the opposing force of the fluid under pressure in the chamber 118.

However, the spring 114 is now effective to assist movement of the diaphragm 116 against the opposing force of the fluid under pressure in the chamber 118, but the spring 114 is substantially weaker than the spring 126 and exerts substantially less force than the spring 126 exerted.

On a slight further increase in the pressure of the fluid in the chamber 106, which is at substantially the same pressure as the fluid in the chambers 16 and 17, the force exerted by the fluid under pressure in the chamber 106, supplemented by the force exerted by the spring 114 acting through the valve 104 and the spring 126, will be sufficient to move the diaphragm 116 against the opposing force of the fluid under pressure in the chamber 118, and the diaphragm 116 will thereupon be moved downwardly into engagement with the projections 129, while the valve 104 will be moved away from the seat rib 110 by the spring 114 so as to permit fluid under pressure to flow from the chamber 112 to the chamber 106 at a rapid rate.

Fluid under pressure can now flow from the brake pipe to the valve chamber 16 and the pressure chamber 17 past the valve 104, as well as through the choke 158, so that the further charging of the valve chamber and the pressure chamber occurs at a rapid rate.

Upon a subsequent reduction in the pressure of the fluid in brake pipe 1 at a service rate to effect a service application of the brakes, the service portion, not shown, of the brake controlling valve device 5a operates, as described in detail in the above identified patent, to close the communication through which fluid under pressure is supplied from the brake pipe to the auxiliary reservoir, not shown, and to the emergency reservoir 4. In addition, the service portion operates to supply fluid under pressure from the auxiliary reservoir to the brake cylinder 2 until the pressure of the fluid in the auxiliary reservoir is reduced substantially to the pressure at which the pressure in the brake pipe is reduced.

On a reduction in the pressure of the fluid in the brake pipe at a service rate, fluid under pressure flows from the valve chamber 16 and the pressure chamber 17 to the chamber 12 on the face of the piston 10, by way of the passage 108 to the chamber 106, and thence past the valve 104 to the chamber 112, from which the fluid flows by way of the passage 154 to the chamber 152 outwardly of the seat rib 136. At this time the diaphragm 134a is held away from the seat rib 136 by the fluid under pressure in the chambers 144 and 152 on opposite sides of the seat rib 136, so that fluid under pressure will flow from the chamber 152 past the seat rib 136 to the chamber 144 within the seat rib 136, and thence by way of the passage 148 and through the choke 150 to the chamber 112 on the face of the piston 10.

The choke 150 is proportioned to permit fluid under pressure to flow from the chambers 16 and 17 at a rate which enables the pressure of the fluid in the chambers 16 and 17 to be reduced substantially as rapidly as the pressure of the fluid in the chamber 12 on the face of the piston 10 is reduced during a reduction in brake pipe pressure at a service rate.

As the pressure of the fluid in the chambers 16 and 17 is reduced by the flow of fluid therefrom to the brake pipe substantially as rapidly as the pressure of the fluid in the chamber 12 is reduced during a reduction in the pressure of the fluid in the brake pipe at a service rate, no differential will be developed in the pressure of the fluid in the chambers on opposite sides of the piston 10, and the piston 10, therefore, will remain in the normal release position.

During a service application of the brakes the pressure of the fluid in the brake pipe is maintained at a substantial value, and the fluid under pressure in the chambers 144 and 152 acting on the face of the diaphragm 134a will maintain the diaphragm 134a away from the seat rib 136 against the opposing force of the spring 138a, while the valve 170 is held in the seated position.

Since the diaphragm 116 of the valve device 102 is subject to the opposing pressures of the fluid in the chambers 106 and 118, which communicate with the valve chamber 16 and the brake pipe 1, respectively, the valve 104 will be held away from the seat rib 110 by the spring 114 during a service reduction in brake pipe pressure, because, as just described, the fluid pressure in the valve chamber 16 is reduced at substantially the same rate as the brake pipe pressure is reduced.

On a subsequent increase in the pressure of the fluid in the brake pipe to effect the release of the brakes, the service portion not shown, of the brake controlling valve device 5a operates, as described in detail in the above identified patent, to release fluid under pressure from the brake cylinder 2, and to open a communication through which fluid under pressure is supplied from the brake pipe 1 to the auxiliary reservoir, not shown, and to the emergency reservoir 4.

On this increase in the pressure of the fluid in the brake pipe there will be a similar increase in the pressure of the fluid in the chamber 12 on the face of the piston 10, and fluid under pressure will flow therefrom through the choke 150 to the passage 148, and therethrough to the chamber 144 on the face of the diaphragm 134a of the valve means 132a. Fluid under pressure supplied to the chamber 144 will flow therefrom by way of the passage 146 to the chamber 118 on the face of the diaphragm 116 to increase the pressure of the fluid in this chamber.

Fluid under pressure supplied to the chamber 144 also flows past the seat rib 136 to the chamber 152 and therefrom through the passage 154 to the chamber 112, and thence past the valve 104 to the chamber 106. Fluid under pressure supplied to the chamber 106 flows therefrom by way of the passage 108 to the valve chamber 16 and the pressure chamber 17 to increase the pressure of the fluid in these chambers, while there will be a similar increase in the pressure of the fluid in the chamber 106 on the face of the diaphragm 116.

In addition, fluid under pressure supplied to the passage 154 will flow through the passage 156, and through the choke 158 to the passage 108 leading to the chambers 16 and 17.

As the diaphragm 134a is held away from the seat rib 136 during a service application of the brakes, the valve 170 is held in engagement with its seat so as to prevent the venting of fluid under pressure from the valve chamber 16 to the atmosphere by way of the chamber 140a and the choke 164.

The rate of increase in the pressure of the fluid in the brake pipe 1 and in the chamber 12 on the face of the piston 10 during the release of the brakes after a service application of the brakes, and the rate of flow of fluid under pressure from the chamber 12 through the choke 150 to the chambers 16 and 17 are such that during normal operation of the brake equipment, the pressure of the fluid in the chambers 16 and 17 will be increased substantially as rapidly as the pressure of the fluid in the chamber 12 is increased. As a result no differential between the pressure of the fluid in the chambers on opposite sides of the piston 10 will be developed during this increase in the pressure of the fluid in the brake pipe, and no force will be exerted on the piston 10 by the fluid under pressure in the chamber 12 to move the piston 10 against the spring 36. The piston 10, therefore, will remain in the normal release position, and will not be moved to the inner release position.

During this increase in the pressure of the fluid in the valve chamber 16 there will be a similar rapid increase in the pressure of the fluid in the chamber 106 of the valve device 102, and as the pressure of the fluid in this chamber is increased substantially as rapidly as the pressure of the fluid in the chamber 118 on the opposite face of the diaphragm 116, which chamber is at substantially the pressure of the fluid in the chamber 12, substantially no force will be exerted on the diaphragm 116 and tending to move the valve 104 against the spring 114 into engagement with the seat rib 110. As a result, therefore, the spring 114 will maintain the valve 104 away from the seat rib 110 so as to permit fluid under pressure to flow from the chamber 112 to the chamber 106, and therefrom by way of the passage 108 to the chambers 16 and 17.

On a reduction in the pressure of the fluid in the brake pipe 1 at an emergency rate to effect an emergency application of the brakes, the service portion, not shown, of the brake controlling valve device 5a operates, as described in detail in the above identified patent, to close the communication through which fluid under pressure is supplied from the brake pipe 1 to the auxiliary reservoir, not shown, and to the emergency reservoir 4, and to supply fluid under pressure from the auxiliary reservoir to the brake cylinder 2.

When the brake pipe pressure is reduced at an emergency rate, there will be a back flow of fluid from the valve chamber 16 to the brake pipe by way of the passage 148 and choke 150, as in a service reduction in the brake pipe pressure, but since the brake pipe pressure is now being reduced at an emergency rate, the pressure on the brake pipe side of the piston 10 will reduce more rapidly than the pressure in the valve chamber 16 can reduce by flow through the restricted port 150, and, as a result, a differential pressure is created in the valve chamber 16 which causes the piston 10 and the auxiliary slide valve 20 to be shifted relative to the main slide valve 18 against the opposing force of the spring 26 acting through the plunger 24.

On this movement of the piston 10 and the stem 22 the auxiliary slide valve 20 is moved relative to the main slide valve 18 so as to uncover a port 156 through the main slide valve 18, which communicates with the passage 80 leading to the chamber 78 on the face of the vent valve piston 76. When the auxiliary slide valve 20 is moved to the position to uncover the port 156 through the main slide valve 18, fluid under pressure from the chamber 16 flows through the port 156 to the passage 80, and therethrough to the chamber 78 on the face of the vent valve piston 76. The rate of flow of fluid under pressure through the passage 80 to the chamber 78 is substantially more rapid than the rate at which fluid under pressure may escape from the chamber 78 through the groove 84 around the piston 76, and through the choke 88 in the passage 86. As a result, there will be a rapid increase in the pressure of the fluid in the chamber 78, and the vent valve piston 76 will be moved to the right, as viewed in the drawings, and this movement of the piston 76 will be transmitted through the stem 94 to move the vent valve 96 away from the seat rib 98 against the opposing force of the spring 100, and of the fluid under pressure in the chamber 97. On this movement of the piston 76, the face of the piston is moved into engagement with the seat rib 92 on the gasket 90 so as to prevent the escape of fluid under pressure from the chamber 78 around the periphery of the piston 76.

On movement of the vent valve 96 away from the seat rib 98 a relatively large opening is provided through which fluid under pressure supplied from the brake pipe by way of the branch pipe 14, and the passages 13 and 99, to the chamber 97 will escape to the atmosphere by way of the atmospheric passage 82. There will, therefore, be a rapid reduction in the pressure of the fluid in the brake pipe, and also in the chamber 12 on the face of the piston 10, as this chamber communicates with the passage 13 and the piston 10 and the stem 22 will thereafter be moved to the right, as viewed in the drawings, very rapidly by fluid under pressure in the chamber 16.

The piston 10 and the stem 22 are moved to the right, as viewed in the drawings, until the face of the piston 10 engages the face of the gasket 160, which is clamped between the emergency portion 8a and the pipe bracket section 7. This is the emergency application position of the piston 10.

On movement of the piston 10 and the stem 22 a short distance toward the application position, a shoulder 158 on the piston stem 22 engages the main slide valve 18, so that on further movement of the piston 10 and the stem 22 toward the application position, the main slide valve 18 is moved upon its seat and uncovers the passage 80 so as to permit fluid under pressure in chamber 16 to continue to flow to the passage 80 and therethrough to the chamber 78 on the face of the vent valve piston 76.

Upon movement of the piston 10 to the emergency application position, the main slide valve 18 is moved so that a cavity 162 therein establishes communication between a port in the seat of the slide valve to which is connected the passage 44 leading from the emergency reservoir 4, and a passage 164 leading to the brake cylinder 2, so that fluid under pressure will now flow from the emergency reservoir 4 to the brake cylinder 2.

Fluid under pressure supplied to the chamber 78 at the face of the vent valve piston will be vented therefrom at a restricted rate through the choke 88 and the passage 86 through the piston 76. The volume of the chambers 16 and 17, and the rate of flow of fluid under pressure through the choke 88, and the other portions of this valve portion, are arranged and proportioned so as to maintain the pressure of the fluid in the chamber 78 at a value sufficient to hold the piston 76 in engagement with the seat rib 92 against the opposing force of the spring 100, and thereby hold the vent valve 96 away from the seat rib 88, until the pressure of the fluid in the brake pipe 1 is reduced substantially to atmospheric pressure.

When the pressure of the fluid in the chamber 78 has been reduced to a relatively low value by the venting of fluid under pressure therefrom through the choke 88 and the passage 86, the force exerted by this fluid on the piston 76 is insufficient to maintain the piston 76 in engagement with the seat rib 92 against the opposing force of the spring 100 acting through the vent valve 96 and the stem 94, and the spring 100 will thereupon move the vent valve 96 into engagement with the seat rib 98, while the piston 76 will be moved away from the seat rib 92 to the position in which it is shown in the drawings, in which position the groove 84 extends around the piston 76.

When the piston 76 is moved to this position any fluid under pressure remaining in the chambers 16 and 17, and in the chamber 78 at the face of the piston 76, can escape therefrom at a rapid rate through the groove 84 around the piston 76, and thence to the atmosphere by way of the passage 82. The chambers 16 and 17, therefore, will be reduced substantially to atmospheric pressure.

On movement of the piston 10 to the application position, the passage 148 is in communication with the chambers 16 and 17, so that the pressure of the fluid in the chambers 144 and 152 at the face of the diaphragm 134a reduces as the pressure of the fluid in the pressure chamber reduces, and when the pressure on the diaphragm 134a has been reduced sufficiently the diaphragm will be moved downwardly by the spring 138a into engagement with the seat rib 136.

When the diaphragm 134a is moved into engagement with the seat rib 136, the valve 182 is pressed into engagement with its seat by force transmitted through the spring 178, while the inwardly extending flange 174 on the plunger 162 engages the flange 168 on the valve 170 and moves this valve away from its seat, thereby opening a communication between the valve chamber 16 and the atmosphere by way of the chamber 140a and the choke 164.

The spring 138a and the area of the diaphragm 134a subject to the fluid under pressure are arranged and proportioned so that the diaphragm 134a is held in its upper position by the fluid in the chambers 144 and 152, so as to maintain the valve 170 in the seated position until the pressure of the fluid in the chamber 16, and therefore in the chambers 144 and 152, has reduced to a relatively low value. As a result, there will be no venting of fluid under pressure from the valve chamber 16 through the valve means 132a until the pressure of the fluid in the valve chamber 16 has been reduced to a relatively low value by the venting of fluid therefrom through the vent valve piston 76.

The pressure of the fluid in the valve chamber 16 will not be reduced to the value at which the diaphragm 134a is moved downwardly by the spring 138a for a substantial time interval, so that the pressure of the fluid supplied from the valve chamber 16 will be maintained a value great enough to exert sufficient force on the vent valve piston 76 to maintain the vent valve 96 open long enough to permit the fluid under pressure in the brake pipe to reduce substantially to atmospheric pressure.

In addition, the pressure of the fluid in the chambers, 106 and 118 on opposite sides of the diaphragm 116 will reduce as the pressure in the chambers 16 and 17 reduces, and as the pressure on the opposite sides of the diaphragm 116 is equal, the valve 104 will be held away from the seat rib 110 by the spring 114, while the diaphragm 116 will be held in engagement with the projections 129.

On a subsequent increase in the pressure of the fluid in the brake pipe 1 to effect release of the brakes, fluid under pressure flows therefrom by way of the branch pipe 14 to the passage 13, and to the chamber 12 on the face of the piston 10. When the pressure of the fluid in the chamber 12 has increased to a predetermined relatively low value, the force exerted by this fluid under pressure on the piston 10, together with the force exerted by the spring 26 acting through the piston stem 22 is sufficient to cause the piston 10 to move away from the gasket 160, if it has not already been moved away from the gasket 16 by the spring 26 alone. On this movement of the piston 10, the stem 22 and the auxiliary slide valve 20 are moved relative to the main slide valve 18, and the auxiliary slide valve 20 is moved to a position to cover the end of the passage 156 through the main slide valve 18.

As the piston 10 moves towards the normal release position, the main slide valve 18 is moved to cut off communication between the passages 44 and 164 by way of the cavity 162, so that communication between the emergency reservoir 4 and the brake cylinder 2 is cut off.

In addition, on this movement of the main slide valve 18, the end of the slide valve covers the end of the passage 80 to cut off communication between the valve chamber 16 and the passage 80, while the slide valve 18 is moved to a position in which the port 156 through the slide valve communicates with the passage 80.

After a certain amount of movement of the piston 10, it will be moved to a position to open communication between the chamber 12 and the port through which fluid under pressure is supplied from the chamber 12 through the choke 150 to the passage 148 leading to the chamber 144 on the face of the diaphragm 134a of the valve means 132a. Fluid under pressure supplied to the chamber 144 will flow therefrom through the passage 146 to the chamber 118 on the face of the diaphragm 116, and on a predetermined increase in the pressure of the fluid in the chamber 118, the diaphragm 116 will be forced upwardly, and its movement will be transmitted through the plunger 120 and the spring 126 to the spring seat 122, and through the stem 124 to the valve 104 to move this valve into engagement with the seat rib 110 against the opposing force of the spring 114.

Fluid under pressure supplied from the brake pipe 1 through the passage 148 to the chamber 144 acts on the area of the diaphragm 134a within the seat rib 136, tending to move the diaphragm away from the seat rib 136. However, as pointed out above, the spring 138a and the other portions of the valve means 132a are proportioned so that the diaphragm 134a is held in engagement with the seat rib 136 until the pressure of the fluid in the chamber 144, and, therefore, in the chamber 12 on the face of the piston 10, has increased to a predetermined relatively high value, which is somewhat higher than is required to effect movement of the piston 10 against the spring 36 to the inner release position.

On an increase in the pressure of the fluid in the chamber 12 on the face of the piston 10 to a value somewhat less than is required to move the diaphragm 134a against the spring 138a away from the seat rib 136, the force exerted on the piston 10 by the fluid in the chamber 12 is great enough to overcome the opposing force of the spring 36, and move the piston 10 and the main slide valve 18 from the normal release position to the inner release position.

If, during the period that the pressure of the fluid in the chamber 12 is increasing, and before the diaphragm 134a is moved away from the seat rib 136, any fluid under pressure should leak from the chamber 12 past the piston 10 and the packing ring 11 to the valve chamber 16, it will escape therefrom by way of the passage 108, the choke 158, passages 156, 154 and 172, and past the unseated valve 170 to the chamber 140a, from which it will flow to the atmosphere through the choke 164.

As means is provided to vent the valve chamber 16 during this period, there is no possibility that fluid under pressure will build up in this chamber and prevent the development of the pressure differential between the chambers 12 and 16 which is necessary to move the piston 10 against the spring 36 from the normal release position to the inner release position. The fluid under pressure in the chamber 12 will be able to move the piston 10 to the inner release position, therefore, even though the leakage of fluid from the chamber 12 to the valve chamber 16 past the piston 10 and the packing ring 11 is excessive.

When the piston 10 is moved to the inner release position, the main slide valve 18 is moved to a position in which the cavity 162 therein establishes communication between the passage 164 leading from the brake cylinder, and the passage 72. Fluid under pressure will thereupon flow from the brake cylinder 2 and the auxiliary reservoir, not shown, by way of the pipe and passage 164, and the cavity 162 in the main slide valve 18, to the passage 72, and through this passage past the ball check valve 70 to the chamber within the seat rib 68. On an increase in the pressure of the fluid in the chamber within the seat rib 68, the accelerated check release valve 64 will be moved away from the seat rib 68 against the opposing force of the spring 66, and fluid under pressure will flow to the chamber 60. At this time, however, the valve 182 is held in the seated position by the diaphragm 134a acting through the spring 178, and fluid under pressure supplied to the chamber 60 will not flow therefrom by way of the passage 184 to the brake pipe.

The valve 182 prevents the flow of fluid from the brake cylinder 2 and the auxiliary reservoir to the brake pipe while the diaphragm 134a is in engagement with the seat rib 136. This prevents the release of fluid from the brake cylinder and the auxiliary reservoir on an increase in the pressure of the fluid in the brake pipe until the brake pipe pressure has been increased to a relatively high value, which is above that required to effect movement of the piston 10 to the inner release position.

This is desirable, because if cars equipped with this type of brake controlling valve device are coupled into a train which includes cars equipped with older types of brake controlling valve devices, which do not vent fluid from the brake pipe to reduce the brake pipe pressure substantially to atmosphere on an emergency application of the brakes, some fluid under pressure may be supplied from the brake pipe on those cars to the chamber 12 of this brake controlling valve device after the vent valve 96 has been moved to the seated position. This fluid may build up to a pressure great enough to cause the piston 10 to be moved to the inner release position, and if fluid under pressure were permitted to flow from the brake cylinder and auxiliary reservoir to the brake pipe, the brake pipe pressure would be further increased, and might result in movement of the service portion of the brake controlling valve device to the release position to release the brakes.

The diaphragm 134a is not moved away from the seat rib 136, and the valve 182 will not be unseated, until the pressure of the fluid in the brake pipe is increased to a value somewhat higher than is required to cause movement of the piston 10 to the inner release position. This pressure is higher than that which will be present in the brake pipe and in the chamber 12 as a result of the flow of fluid thereto from the cars equipped with older types of brake controlling valve devices. As a result, therefore, undesired flow of fluid from the brake cylinder and auxiliary reservoir to the brake pipe is prevented, even though the piston 10 is moved to the inner release position.

On a further increase in the pressure of the fluid in the chamber 12, and in the chamber 144 on the face of the diaphragm 134a, the force exerted by this fluid under pressure on the diaphragm 134a is sufficient to overcome the opposing force of the spring 138a, and the diaphragm 134a is thereupon moved upwardly, as viewed in Fig. 2 of the drawings, away from the seat rib 136. As soon as the diaphragm 134a is moved away from the seat rib 136, fluid under pressure flows from the chamber 144 past the seat rib 136 to the chamber 152 outwardly of the seat rib, and because of the increased area of the diaphragm 134a subject to fluid under pressure, there is a substantial increase in the force exerted on this diaphragm, and it will be moved upwardly very rapidly until its further movement is prevented by engagement of a portion of the plunger 162 with a portion of the housing of the emergency portion 8a.

On upward movement of the diaphragm 134a, the inwardly extending flange 186 on the plunger 176 engages the flange 180 on the valve 182 and lifts the valve away from its seat, thereby permitting fluid under pressure supplied from the brake cylinder 2 and the auxiliary reservoir, not shown, to the accelerated release check valve chamber 60, to flow therefrom by way of the passage 184 to the chamber 144, from which it may flow by way of the passage 148 and the choke 150 to the chamber 12 on the face of the piston 10, and thence by way of the passage 13 to the brake pipe 1 to further increase the pressure of the fluid in the brake pipe.

The fluid under pressure thus supplied to the brake pipe causes a local increase in brake pipe pressure at each car which is transmitted serially throughout the train so as to secure movement of the pistons 10 of the emergency portions of the brake controlling valve devices to their inner release positions, and to also increase the pressure of the fluid in the brake pipe so as to effect movement of the diaphragms 134a away from the seat ribs 136.

In addition, on this upward movement of the diaphragm 134a the plunger 162 is moved upwardly and its movement is transmitted through the spring 166 to the valve 170 to move this valve to the seated position. On engagement of the valve 170 with its seat, and on further movement of the plunger 162, the spring 166 is compressed, the plunger 162 being moved relative to the valve 170. When the valve 170 is moved to the seated position communication between the valve chamber 16 and the atmosphere through the choke 164 is cut off.

Fluid under pressure will flow from the auxiliary reservoir, not shown, and the brake cylinder 2 to the brake pipe until the pressure of the fluid in the brake cylinder and the auxiliary reservoir and in the brake pipe has substantially equalized by the flow of fluid under pressure from the brake cylinder and auxiliary reservoir to the brake pipe. The accelerated release check valve 64 will then be moved into engagement with the seat rib 68 by the spring 66 so as to cut off further flow of fluid under pressure from the brake cylinder to the brake pipe, and to prevent back flow of fluid under pressure from the brake pipe to the brake cylinder.

On movement of the diaphragm 134a away from the seat rib 136, and on the supply of fluid under pressure from the brake pipe to the chamber 152 outwardly of the seat rib 136, fluid under pressure will flow therefrom by way of the passage 154 to the passage 156, and through the choke 158 to the passage 108 leading to the valve chamber 16 and the pressure chamber 17, and to the chamber 106 of the valve device 102.

In addition, fluid under pressure supplied to the passage 154 flows to the chamber 112 withers in the seat rib 110, but, as pointed out above, the valve 104 has previously been moved to the seated position by fluid under pressure supplied from the chamber 144 through the passage 146 to the chamber 118 at the face of the diaphragm 116.

The choke 158 restricts the rate of flow of fluid from the brake pipe to the valve chamber 16 and the pressure chamber 17, with the result that there is a slow rate of increase in the pressure of the fluid in these chambers.

After a time interval the pressure of the fluid in the chamber 16 will have increased to a value such that the force exerted by the fluid in this chamber, together with the force exerted by the spring 36 on the piston 10, is able to overcome the opposing force of the fluid under pressure in the chamber 12, and the piston 10 will thereupon be moved to the right, as viewed in Fig. 2 of the drawings, while the slide valve 18 will be moved upon its seat to a position in which the cavity 162 no longer establishes communication between the passage 164 and the passage 72.

When the piston 10 has moved from the inner release position to the normal release position, the plunger 30 engages a portion of the body of the emergency portion 8a so that the spring 36 is no longer effective to effect movement of the piston 10, and the higher pressure of the fluid in the chamber 12 prevents further movement of the piston 10 by the fluid under pressure in the chamber 16.

The rate of flow of fluid under pressure to the chamber 158 is such that the pressure of the fluid in the chamber 16 will not build up to a value sufficient to effect movement of the piston from the inner release position to the normal release position until the piston 10 has been in the inner release position for a period of time long enough to permit the pressure of the fluid in the brake cylinder 2 and in the auxiliary reservoir, not shown, to substantially equalize with the pressure in the brake pipe.

After movement of the piston 10 to the normal release position, fluid under pressure continues to flow from the brake pipe through the choke 158 to the chambers 16 and 17, and to the chamber 106 of the valve device 102.

When the pressure of the fluid in the chamber 106 has increased to a value such that the difference between the pressure of the fluid in the chamber 106, and in the brake pipe, and, therefore, in the chamber 118 on the opposite face of the diaphragm 116, is less than a predetermined amount, the spring 126 will expand and will move the diaphragm 116 and the plunger 120 downwardly until the spring seat 122 engages the inwardly extending flange 128 on the plunger 120. On a further reduction in the differential between the pressure of the fluid in the chamber 106 and in the brake pipe, the spring 114 will move the valve 104 downwardly away from the seat rib 110, and this movement of the valve 104 will be transmitted through the spring 126 to move the diaphragm 116 into engagement with the projections 129.

After movement of the valve 104 away from the seat rib 110, fluid under pressure supplied to the passage 154 flows to the chamber 112 and thence past the seat rib 110 to the chamber 106, and therefrom by way of the passage 108 to the chambers 16 and 17 to increase the pressure of the fluid in these chambers at a relatively rapid rate until the pressure of the fluid in these chambers has equalized with the pressure of the fluid in the chamber 12, and in the brake pipe 1.

On an increase in the pressure of the fluid in the brake pipe 1, fluid under pressure flows therefrom by way of the branch pipe 14 and through the passages in the pipe bracket section 7 to the service portion, not shown, of the brake controlling valve device 5a, and when the pressure of the fluid supplied from the brake pipe 1 to the service portion has increased to a value exceeding the pressure of the fluid in the auxiliary reservoir, not shown, the service portion operates, as described in detail in the above identified patent, to release fluid under pressure from the brake cylinder 2, and to open a communication through which fluid under pressure is supplied from the brake pipe 1 to the auxiliary reservoir, and to the emergency reservoir 4.

It will be seen that the emergency valve portion shown in Fig. 2 of the drawings, like that shown in Fig. 1 of the drawings, incorporates means to cut off the flow of fluid from the brake pipe to the valve chamber until a pressure has been developed in the brake pipe which is sufficient to insure movement of the piston of the valve portion to a position to completely open the communication through which fluid under pressure flows between the valve chamber and the brake pipe.

In addition, it will be seen that the emergency portion shown in Fig. 2 of the drawings operates to cut off the flow of fluid from the brake pipe to the valve chamber 16 until the pressure of the fluid in the brake pipe has increased to a value great enough to cause movement of the piston of this valve portion to its inner release position, and also that the valve chamber is connected to the atmosphere until the passage through which fluid is supplied to this chamber is opened. This provides means to vent any fluid which leaks to the valve chamber while the pressure in the brake pipe is being increased, and insures that sufficient differential will be developed between the pressures in the brake pipe and the valve chamber to cause movement of the piston to the inner release position.

It will be seen also that means is provided to prevent the flow of fluid from the brake cylinder and the auxiliary reservoir to the brake pipe, even though the piston moves to the inner release position, unless the brake pipe pressure is increased to a relatively high value, which will not be present following an emergency application of the brakes, except on an increase in brake pipe pressure to effect the release of the brakes.

While two embodiments of the improved brake controlling valve device provided by my invention have been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a fluid pressure brake equipment, in combination, a brake pipe, and an emergency valve device comprising a movable abutment subject to the opposing pressures of the fluid in the brake pipe and of the fluid in a pressure chamber, a passage controlled by said abutment through which fluid under pressure may flow between the brake pipe and the pressure chamber in either direction, and valve means controlling communication through said passage, said valve means being normally operative to cut off communication through said passage and being operated to permit communication through said passage on an increase to a given value in the pressure of the fluid supplied from the brake pipe to said passage.

2. In a fluid pressure brake equipment for a vehicle, in combination, a brake pipe, and an emergency valve device comprising a movable abutment subject to the opposing pressures of the fluid in the brake pipe and of the fluid in a pressure chamber, a passage through which fluid under pressure may flow between the brake pipe and the pressure chamber in either direction, and valve means responsive to the pressure of the fluid supplied from the brake pipe to said passage and controlling communication through said passage, said valve means being operated to permit communication through said passage on an increase to a given value in the pressure of the fluid supplied to said passage.

3. In a fluid pressure brake equipment for a vehicle, in combination, a brake pipe, and an emergency valve device comprising a movable abutment constantly subject to the opposing pressures of the fluid in the brake pipe and of the fluid in a pressure chamber, a passage through which fluid under pressure may be supplied from the brake pipe to the pressure chamber, and valve means responsive to the pressure of the fluid supplied to said passage and controlling communication through said passage, said valve means being operated to permit communication through said passage on an increase to a given value in the pressure of the fluid supplied to said passage and to thereafter maintain communication through said passage until the pressure of the fluid in said passage is reduced to a value substantially below said given value.

4. In a fluid pressure brake equipment, in combination, a brake pipe, and an emergency valve device comprising a movable abutment constantly subject to the opposing pressures of the fluid in the brake pipe and of the fluid in a pressure chamber, a passage controlled by said abutment through which fluid under pressure may be supplied from the brake pipe to the pressure chamber, and valve means responsive to the pressure of the fluid supplied to said passage and controlling communication through the passage, said valve means being adapted to cut off the flow of fluid through said passage until the pressure of the fluid supplied to said passage has increased to a predetermined value and to maintain communication through said passage until the pressure of the fluid in said passage is reduced to a value substantially below said predetermined value.

5. In a fluid pressure brake equipment, in combination, a brake pipe, a vent valve for venting fluid under pressure from the brake pipe, a movable abutment subject to the opposing pressures of the fluid in the brake pipe and of the fluid in a pressure chamber for controlling said vent valve, a passage controlled by said abutment through which fluid under pressure may flow between the brake pipe and the pressure chamber in either direction, and valve means subject to and operated on an increase in the pressure of the fluid in said passage to open communication through said passage.

6. In a fluid pressure brake equipment, in combination, a brake pipe, a vent valve for venting fluid under pressure from the brake pipe, a movable abutment subject to the opposing pressures of the fluid in the brake pipe and of the fluid in a pressure chamber for controlling said vent valve, a passage controlled by said abutment through which fluid under pressure may flow between the brake pipe and the pressure chamber, and valve means subject to and operated on an increase to a given value in the pressure of the fluid supplied to said passage to open communication through said passage, said valve means being adapted to maintain communication through said passage until the pressure of the fluid in said passage is reduced to a value substantially below said given value.

7. In a fluid pressure brake equipment for a vehicle, in combination, a brake pipe, and an emergency valve device comprising a movable abutment constantly subject to the opposing pressures of the fluid in the brake pipe and of the fluid in a pressure chamber, and valve means controlling the supply of fluid under pressure from the brake pipe to the pressure chamber, said valve means comprising a movable abutment adapted to have sealing engagement with a seat surrounding an area on the face of the abutment and covering a portion only of the abutment, yielding resistance means urging said abutment into engagement with the said seat, the area on one side of said seat being in communication with the pressure chamber, and means for supplying fluid under pressure from the brake pipe to the area on the other side of said seat.

8. In a fluid pressure brake equipment for a vehicle, in combination, a brake pipe, and an emergency valve device comprising a movable abutment subject to the opposing pressures of the fluid in the brake pipe and of the fluid in a pressure chamber, and valve means controlling the supply of fluid under pressure from the brake pipe to the pressure chamber, said valve means comprising a movable abutment adapted to have sealing engagement with a seat surrounding an area on the face of the abutment and covering a portion only of the abutment, yielding resistance means urging said abutment into engagement with the said seat, the area on one side of said seat being in communication with the pressure chamber, and means controlled by said first abutment for supplying fluid under pressure from the brake pipe to the area on the other side of said seat.

9. In a fluid pressure brake equipment for a vehicle, in combination, a brake pipe, and an emergency valve device comprising a movable abutment subject to the opposing pressures of the fluid in the brake pipe and of the fluid in a pressure chamber, said emergency valve device having a passage through which fluid may flow from the pressure chamber to the brake pipe to reduce the pressure of the fluid in the pressure chamber substantially as rapidly as the pressure of the fluid in the brake pipe is reduced in effecting a service application of the brakes, a valve device for controlling the flow of fluid through said passage from the brake pipe to the pressure chamber, a by-pass passage extending around said valve device through which fluid may flow from the brake pipe to the pressure chamber, and valve means responsive to the pressure of the fluid supplied to said passage for also controlling communication through said passage.

10. In a fluid pressure brake equipment for a vehicle, in combination, a brake pipe, and an emergency valve device comprising a movable abutment subject to the opposing pressures of the fluid in the brake pipe and of the fluid in a pressure chamber, said emergency valve device having a passage controlled by said abutment through which fluid may flow from the pressure chamber to the brake pipe to reduce the pressure of the fluid in the pressure chamber substantially as rapidly as the pressure of the fluid in the brake pipe is reduced in effecting a service application of the brakes, a valve device for controlling the flow of fluid through said passage from the brake pipe to the pressure chamber, a by-pass passage extending around the valve device through which fluid may flow from the brake pipe to the pressure chamber, and valve means responsive to the pressure of the fluid supplied to said passage for also controlling communication through said passage.

11. In a fluid pressure brake equipment for a vehicle, in combination, a brake pipe, and an emergency valve device comprising a movable abutment subject to the opposing pressures of the fluid in the brake pipe and of the fluid in a pressure chamber, a passage controlled by the abutment through which fluid may flow from the pressure chamber to the brake pipe to reduce the pressure of the fluid in the pressure chamber substantially as rapidly as the pressure of the fluid in the brake pipe is reduced in effecting a service application of the brakes, a valve device for regulating the flow of fluid through said passage from the brake pipe to the pressure chamber, a supply passage controlled by said abutment and through which fluid under pressure may flow from the brake pipe to the pressure chamber, and valve means responsive to the pressure of the fluid supplied to said supply passage for controlling communication through said supply passage.

12. In a fluid pressure brake equipment for a vehicle, in combination, a brake pipe, and an emergency valve device comprising a movable abutment subject to the opposing pressures of the fluid in the brake pipe and of the fluid in a pressure chamber, a passage controlled by the abutment through which fluid may flow from the pressure chamber to the brake pipe to reduce the pressure of the fluid in the pressure chamber substantially as rapidly as the pressure of the fluid in the brake pipe is reduced in effecting a service application of the brakes, a valve device for regulating the flow of fluid through said passage from the brake pipe to the pressure chamber, a supply passage controlled by said abutment and through which fluid under pressure may flow from the brake pipe to the pressure chamber, and valve means responsive to the pressure of the fluid supplied to said supply passage for controlling communication through said supply passage, said valve means being operated to establish communication through said passage on an increase to a given value in the pressure of the fluid supplied to said passage and to thereafter maintain communication through said passage until the pressure of the fluid supplied to said passage is reduced substantially below said given value.

13. In a fluid pressure brake equipment for a vehicle, in combination, a brake pipe, a brake cylinder, valve means controlling a passage through which fluid under pressure may be supplied from the brake cylinder to the brake pipe, a movable abutment subject to the opposing pressures of the fluid in the brake pipe and of the fluid in a pressure chamber for operating said valve means, yielding resistance means opposing movement of the valve means to a position to establish communication through said passage, a passage controlled by said abutment through which fluid under pressure may be supplied from the brake pipe to the pressure chamber, and a valve device responsive to the pressure of fluid supplied to said passage for controlling communication through said passage, said valve means being operated to cut off communication through said passage until the pressure of the fluid supplied thereto has increased to a given value.

14. In a fluid pressure brake, in combination, a brake cylinder, a brake pipe, valve means controlling a passage through which fluid under pressure may be supplied from the brake cylinder to the brake pipe, movable abutment means subject to the opposing pressures of the fluid in the brake pipe and of the fluid in a pressure chamber, the abutment being operated to condition the valve means to permit communication through said passage on an increase in the pressure of the fluid in the brake pipe to a given value above the pressure of the fluid in the pressure chamber, a passage controlled by said movable abutment means and through which fluid under pressure may be supplied from the brake pipe to the pressure chamber, and a valve device responsive to the pressure of the fluid supplied to said passage for controlling communication through said passage, said valve device being operative to cut off communication through said passage until the pressure of the fluid supplied thereto has increased to a predetermined value.

15. In a fluid pressure brake equipment for a vehicle, in combination, a brake pipe, and an emergency valve device comprising a movable abutment subject to the opposing pressures of the fluid in the brake pipe and of the fluid in a pressure chamber, a passage controlled by said abutment through which fluid may flow from the pressure chamber to the brake pipe to reduce the pressure of the fluid in the pressure chamber substantially as rapidly as the pressure of the fluid in the brake pipe is reduced in effecting a service application of the brakes, a valve device for regulating the flow of fluid under pressure through said passage from the brake pipe to the pressure chamber, valve means responsive to the pressure of the fluid supplied thereto for supplying fluid under pressure to the pressure chamber, and means controlled by said abutment for supplying fluid under pressure to said valve means.

16. In a fluid pressure brake equipment for a vehicle, in combination, a brake pipe, and an emergency valve device comprising a movable abutment subject to the opposing pressures of the fluid in the brake pipe and of the fluid in a pressure chamber, a passage controlled by said abutment through which fluid may flow from the pressure chamber to the brake pipe to reduce the pressure of fluid in the pressure chamber substantially as rapidly as the pressure of the fluid in the brake pipe is reduced in effecting a service application of the brakes, a valve device for regulating the flow of fluid under pressure through said passage from the brake pipe to the pressure chamber, valve means responsive to the pressure of the fluid supplied thereto for supplying fluid under pressure from the brake pipe to the pressure chamber, and means controlled by said abutment for supplying fluid under pressure from the brake pipe to said valve means.

17. In a fluid pressure brake equipment, in combination, a brake pipe, a brake cylinder, valve means movable to an inner release position to supply fluid from the brake cylinder to the brake pipe, movable abutment means subject to the opposing pressures of the fluid in the brake pipe and of the fluid in a pressure chamber for operating said valve means and for controlling a communication through which fluid may flow from the brake pipe to the pressure chamber, said abutment means being operated on an increase in the pressure of the fluid in the brake pipe to a given value above the pressure of the fluid in the pressure chamber to move said valve means to the inner release position, and means subject to the pressure of the fluid supplied to said communication and operative to prevent flow through said communication until the pressure of the fluid supplied thereto has increased to a higher value than said given value.

18. In a fluid pressure brake equipment, in combination, a brake pipe, a brake cylinder, valve means movable to an inner release position to supply fluid from the brake cylinder to the brake pipe, movable abutment means subject to the opposing pressures of the fluid in the brake pipe and of the fluid in a pressure chamber for operating said valve means and for controlling a communication through which fluid may flow from the brake pipe to the pressure chamber, said abutment means being operative on an increase in the pressure of the fluid in the brake pipe to a given value above the pressure of the fluid in the pressure chamber to move said valve means to the inner release position, a movable abutment subject to the pressure of the fluid supplied to said communication and operative to prevent flow of fluid through said communication until the pressure of the fluid supplied thereto has increased to a higher value than said given value, and means operated by said abutment for venting fluid from the pressure chamber.

19. In a fluid pressure brake equipment, in combination, a brake pipe, a brake cylinder, valve means movable to an inner release position to supply fluid from the brake cylinder to the brake pipe, movable abutment means subject to the opposing pressures of the fluid in the brake pipe and of the fluid in a pressure chamber for operating said valve means and for controlling a communication through which fluid may flow from the brake pipe to the pressure chamber, said abutment means being operative on an increase in the pressure of the fluid in the brake pipe to a given value above the pressure of the fluid in the pressure chamber to move said valve means to the inner release position, a movable abutment subject to the pressure of the fluid supplied to said communication and operative to prevent flow of fluid through said communication until the pressure of the fluid supplied thereto has increased to a higher value than said given value, and means operated by said abutment for controlling the supply of fluid from the brake cylinder to the brake pipe.

20. In a fluid pressure brake equipment, in combination, a brake pipe, a brake cylinder, valve means movable to an inner release position to supply fluid from the brake cylinder to the brake pipe, movable abutment means subject to the opposing pressures of the fluid in the brake pipe and of the fluid in a pressure chamber for operating said valve means and for controlling a communication through which fluid may flow from the brake pipe to the pressure chamber, said abutment means being operative on an increase in the pressure of the fluid in the brake pipe to a given value above the pressure of the fluid in the pressure chamber to move said valve means to the inner release position, a movable abutment subject to the pressure of the fluid supplied to said communication and operative to prevent flow of fluid through said communication until the pressure of the fluid supplied thereto has increased to a higher value than said given value, means operated by said abutment for venting fluid from the pressure chamber, and means operated by said abutment for controlling the supply of fluid from the brake cylinder to the brake pipe.

21. In a fluid pressure brake equipment, in combination, a brake pipe, a brake cylinder, valve means controlling a communication through which fluid under pressure may be supplied from the brake cylinder to the brake pipe, movable abutment means subject to the opposing pressures of the fluid in the brake pipe and in a pressure chamber for operating said valve means, a movable abutment subject to the pressure of the fluid in a chamber for controlling said communication, said abutment being operated to permit the flow of fluid through said communication only on an increase in the pressure of the fluid in said chamber to a given value, and means for supplying fluid under pressure from the brake pipe to said chamber.

22. In a fluid pressure brake equipment for a vehicle, in combination, a brake pipe and an emergency valve device comprising a movable abutment subject to the opposing pressures of the fluid in the brake pipe and of the fluid in a pressure chamber, means controlled by said abutment for establishing communication through which fluid under pressure may be supplied from the pressure chamber to the brake pipe to reduce the pressure in the pressure chamber at a rate corresponding with the rate at which the brake pipe pressure is reduced in effecting a service application of the brakes, valve means operated on a predetermined increase in fluid pressure to establish a communication through which fluid is supplied from the brake pipe to the pressure chamber, and means controlled by said abutment for supplying fluid from the brake pipe to said valve means.

23. In a fluid pressure brake equipment for a vehicle, in combination, a brake pipe and an emergency valve device comprising a movable abutment subject to the opposing pressures of the fluid in the brake pipe and of the fluid in a pressure chamber, valve means operated on a predetermined increase in fluid pressure to establish communication through which fluid may be supplied from the brake pipe to the pressure chamber, means controlled by said abutment for supplying fluid under pressure from the brake pipe to said valve means, and means controlled by said abutment and said valve means through which fluid under pressure may be supplied from the pressure chamber to the brake pipe to reduce the pressure in the pressure chamber at a rate corresponding with the rate at which the brake pipe pressure is reduced in effecting a service application of the brakes.

24. In a fluid pressure brake equipment, in combination, a brake pipe and an emergency valve device comprising a movable abutment constantly subject to the opposing pressures of the fluid in the brake pipe and of the fluid in a pressure chamber, a passage controlled by said abutment through which fluid may be supplied from the brake pipe to the pressure chamber, and valve means operative to cut off communication through said passage until the pressure of the fluid supplied from the brake pipe to said passage exceeds a predetermined pressure and to thereafter establish communication through said passage to permit the pressure chamber to be charged with fluid at the pressure carried in the brake pipe.

25. In a fluid pressure brake equipment, in combination, a brake pipe and an emergency valve device comprising a movable abutment subject to the opposing pressures of the fluid in the brake pipe and of the fluid in a pressure chamber, a passage through which fluid may be supplied from the brake pipe to the pressure chamber, valve means responsive to the pressure of the fluid supplied thereto and operative to cut off communication through said passage until the pressure of the fluid supplied thereto exceeds a predetermined pressure and to thereafter establish communication through said passage to permit the pressure chamber to be charged with fluid at the pressure carried in the brake pipe, and means controlled by said abutment for supplying fluid from the brake pipe to said valve means.

26. In a fluid pressure brake equipment, in combination, a brake pipe, a brake cylinder, valve means controlling a communication through which fluid under pressure may be supplied from the brake cylinder to the brake pipe, a movable abutment subject to the opposing pressures of the fluid in the brake pipe and of the fluid in a pressure chamber for operating said valve means, said abutment being operated on a predetermined increase in the pressure of the fluid in the brake pipe above the pressure of the fluid in the pressure chamber to condition the valve means to establish said communication, a valve device operated on an increase in the pressure of the fluid supplied thereto to a value higher than said predetermined value for supplying fluid under pressure to said pressure chamber, and means controlled by said abutment for supplying fluid under pressure from the brake pipe to said valve device.

27. In a fluid pressure brake equipment, in combination, a brake pipe, a brake cylinder, valve means controlling a communication through which fluid under pressure may be supplied from the brake cylinder to the brake pipe, a movable abutment subject to the opposing pressures of the fluid in the brake pipe and of the fluid in a pressure chamber for operating said valve means, said abutment being operated on a predetermined increase in the pressure of the fluid in the brake pipe above the pressure of the fluid in the pressure chamber to condition the valve means to establish said communication, a valve device operated on an increase in the pressure of the fluid supplied thereto to a value higher than said predetermined value for supplying fluid under pressure from the brake pipe to said pressure chamber, and means controlled by said abutment for supplying fluid under pressure from the brake pipe to said valve device.

JOHN CANETTA.